US012612975B2

(12) United States Patent
Jeong et al.

(10) Patent No.: US 12,612,975 B2
(45) Date of Patent: Apr. 28, 2026

(54) MULTI-WAY COOLANT VALVE AND HEAT PUMP SYSTEM HAVING THE SAME

(71) Applicants: Hyundai Motor Company, Seoul (KR); Kia Corporation, Seoul (KR)

(72) Inventors: Seong-Bin Jeong, Hwaseong-si (KR); Wan Je Cho, Hwaseong-si (KR); Ji Wan Son, Yongin-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 285 days.

(21) Appl. No.: 18/189,497

(22) Filed: Mar. 24, 2023

(65) Prior Publication Data

US 2024/0151313 A1 May 9, 2024

(30) Foreign Application Priority Data

Nov. 9, 2022 (KR) ........................ 10-2022-0148376

(51) Int. Cl.
*F16K 11/085* (2006.01)
*F01P 7/14* (2006.01)
(Continued)

(52) U.S. Cl.
CPC ............ *F16K 11/0856* (2013.01); *F01P 7/14* (2013.01); *F16K 27/065* (2013.01);
(Continued)

(58) Field of Classification Search
CPC .. F16K 11/0856; F16K 27/065; F16K 31/041; F25B 41/20; F25B 2600/25; F25B 2313/0276; B60H 1/32284
See application file for complete search history.

(56) References Cited

U.S. PATENT DOCUMENTS 6,047,770 A * 4/2000 Suzuki ................. B60H 1/3204
62/526
2015/0027572 A1* 1/2015 Morein ................. F16K 41/026
137/594
(Continued)

FOREIGN PATENT DOCUMENTS

CN 115139749 A * 10/2022
KR 20210047733 A * 4/2021
KR 20230032228 A 3/2023

OTHER PUBLICATIONS

Lee et al. (KR20210047733A) English Translation (Year: 2021).*
Xu et al (CN115139749A) English Translation (Year: 2022).*

*Primary Examiner* — Elizabeth J Martin
*Assistant Examiner* — Keona Lauren Banks
(74) *Attorney, Agent, or Firm* — Slater Matsil, LLP

(57) ABSTRACT

A multi-way coolant valve includes an outer housing including a first outer inlet, a second outer inlet, a third outer inlet, a fourth outer inlet, a first outer outlet, and a second outer outlet, an inner housing rotatably provided within the outer housing and configured to define a coolant flow path, and a driver connected to a first rotation center of the inner housing and configured to selectively rotate the inner housing within the outer housing, wherein, as the inner housing rotates by a preset interval according to a selected mode of a vehicle, the first outer inlet or the second outer inlet selectively communicates with the first outer outlet, and the third outer inlet or the fourth outer inlet selectively communicates with the second outer outlet.

20 Claims, 26 Drawing Sheets

(51) Int. Cl.
    F16K 27/06       (2006.01)
    F16K 31/04       (2006.01)

(52) U.S. Cl.
    CPC ...... F16K 31/041 (2013.01); *F01P 2007/146*
                (2013.01); *F01P 2050/22* (2013.01)

(56)              References Cited

U.S. PATENT DOCUMENTS

| | | | |
|---|---|---|---|
| 2016/0040585 A1* | 2/2016 | Schaefer | F16K 11/0876 |
| | | | 137/594 |
| 2023/0065082 A1 | 3/2023 | Jeong et al. | |
| 2023/0175599 A1* | 6/2023 | Gill | F16K 11/0856 |
| | | | 137/625.47 |
| 2023/0304590 A1* | 9/2023 | Jönsson | F16K 11/0856 |
| 2024/0133471 A1* | 4/2024 | Hong | F16K 11/0873 |

* cited by examiner

1

MULTI-WAY COOLANT VALVE AND HEAT PUMP SYSTEM HAVING THE SAME

CROSS-REFERENCE TO RELATED APPLICATIONS

This application claims the benefit of Korean Patent Application No. 10-2022-0148376, filed on Nov. 9, 2022, which application is hereby incorporated herein by reference.

TECHNICAL FIELD

The present disclosure relates to a multi-way coolant valve and a heat pump system having the same.

BACKGROUND

Generally, an air conditioning system for a vehicle includes an air conditioner unit circulating a refrigerant in order to heat or cool an interior of the vehicle.

The air conditioner unit, which is to maintain the interior of the vehicle at an appropriate temperature regardless of a change in an external temperature to maintain a comfortable interior environment, is configured to heat or cool the interior of the vehicle by heat-exchange by a condenser in a process in which a refrigerant discharged by driving of a compressor is circulated back to the compressor through the condenser, a receiver drier, an expansion valve, and an evaporator.

That is, the air conditioner unit lowers a temperature and a humidity of the interior by condensing a high-temperature high-pressure gas-phase refrigerant compressed from the compressor by the condenser, passing the refrigerant through the receiver drier and the expansion valve, and then evaporating the refrigerant in the evaporator in a cooling mode.

Meanwhile, recently, in accordance with a continuous increase in interest in energy efficiency and an environmental pollution problem, the development of an environmentally friendly vehicle capable of substantially substituting for an internal combustion engine vehicle is required, and the environmentally friendly vehicle is classified into an electric vehicle driven using a fuel cell or electricity as a power source and a hybrid vehicle driven using an engine and a battery.

In the electric vehicle or the hybrid vehicle among these environmentally friendly vehicles, a separate heater is not used unlike an air conditioner of a general vehicle, and an air conditioner used in the environmentally friendly vehicle is generally called a heat pump system.

Meanwhile, the electric vehicle with fuel cells as power sources generates driving force by converting chemical reaction energy between oxygen and hydrogen into electrical energy. In this process, heat energy is generated by a chemical reaction in a fuel cell. Therefore, it is necessary in securing performance of the fuel cell to effectively remove generated heat.

In addition, the hybrid vehicle generates driving force by driving a motor using electricity supplied from the fuel cell described above or an electrical battery, together with an engine operated by a general fuel. Therefore, heat generated from the fuel cell or the battery and the motor should be effectively removed in order to secure performance of the motor.

Therefore, in the hybrid vehicle or the electric vehicle according to the related art, cooling means, a heat pump system, and a battery cooling system, respectively, should be configured as separate closed circuits so as to prevent heat generation of the motor, an electric component, and the battery including a fuel cell.

Therefore, a size and a weight of a cooling module disposed at the front of the vehicle are increased, and a layout of connection pipes supplying a refrigerant and a coolant to each of the heat pump system, the cooling means, and the battery cooling system in an engine compartment becomes complicated.

In addition, a battery cooling system that heats or cools the battery according to the vehicle condition so that the battery can perform optimally is separately equipped, and a large number of valves are applied to be connected with respective connection pipes, which increases an overall manufacturing cost of a vehicle.

The above information disclosed in this background section is only for enhancement of understanding of the background of embodiments of the disclosure, and therefore it may contain information that does not form the prior art that is already known to a person of ordinary skill in the art.

SUMMARY

The present disclosure relates to a multi-way coolant valve and a heat pump system having the same. Particular embodiments relate to a multi-way coolant valve forming a plurality of coolant lines to simplify an overall configuration and a heat pump system having the same.

Embodiments of the present disclosure provide a multi-way coolant valve and a heat pump system having the same capable of forming a plurality of coolant lines through a single coolant valve, thereby capable of simplifying the system layout and manufacturing cost.

Embodiments of the present disclosure provide a multi-way coolant valve and a heat pump system having the same capable of forming a plurality of coolant lines depending on selected modes of the vehicle through a simplified control of a single valve.

A multi-way coolant valve may include an outer housing formed with a first outer inlet, a second outer inlet, a third outer inlet, a fourth outer inlet, a first outer outlet, and a second outer outlet, an inner housing rotatably provided within the outer housing, and for forming a coolant flow path, and a driving unit connected to a rotation center of the inner housing, and configured to selectively rotate the inner housing within the outer housing, where, as the inner housing rotates by a preset interval according to a selected mode of a vehicle, the first outer inlet or the second outer inlet selectively communicates with the first outer outlet, and the third outer inlet or the fourth outer inlet selectively communicates with the second outer outlet.

The inner housing may include an inner body of a cylindrical shape having an open upper side and an open lower side, a first partition wall configured to partition the inner body into a first inner body and a second inner body along a height direction, a pair of second partition walls formed in parallel at both sides of the inner body to form a first inner chamber within the first inner body, a third partition wall configured to divide an interior of the second inner body into second, third, and fourth inner chambers spaced apart at a preset angle circumferentially around a rotation center, and a plurality of penetration holes formed along exterior circumferences of the first inner body and the second inner body.

The plurality of penetration holes may include first to fourth penetration holes formed at locations spaced apart by a preset angle along the circumference of the first inner body, excluding a portion formed with the second partition wall, and fifth to tenth penetration holes formed at locations spaced apart by a preset angle along a circumference of the second inner body.

The first to fourth penetration holes may communicate with the first inner chamber. The fifth and tenth penetration holes may communicate with the second inner chamber. The sixth and seventh penetration holes may communicate with the third inner chamber. The eighth and ninth penetration holes may communicate with the fourth inner chamber.

The first penetration hole may be formed at a location spaced apart by an angle of 60° with respect to a virtual center line passing through the center of the inner housing. The second penetration hole may be formed at a location spaced apart from the first penetration hole by an angle of 60°. The third penetration hole may be formed at a location spaced apart from the second penetration hole by an angle of 120°. The fourth penetration hole may be formed at a location spaced apart from the third penetration hole by an angle of 60°.

The selected mode may be selected from a plurality of modes that may include a first mode, a second mode, a third mode, and a fourth mode in which the inner housing rotates within the outer housing by corresponding angles.

In the first mode, the first outer inlet may communicate with the first outer outlet through the first inner chamber, and the third outer inlet may communicate with the second outer outlet through the fourth inner chamber.

In the second mode, the second outer inlet may communicate with the first outer outlet through the first inner chamber, and the third outer inlet may communicate with the second outer outlet through the third inner chamber.

In the third mode, the first outer inlet may communicate with the first outer outlet through the first inner chamber, and the fourth outer inlet may communicate with the second outer outlet through the second inner chamber.

In the fourth mode, the second outer inlet may communicate with the first outer outlet through the first inner chamber, and the fourth outer inlet may communicate with the second outer outlet through the fourth inner chamber.

The first and second penetration holes may be disposed on a same line with the sixth and seventh penetration holes along a height direction of the inner housing. The third and fourth penetration holes may be disposed on a same line with the ninth and tenth penetration holes along the height direction of the inner housing.

The fifth to tenth penetration holes may be respectively formed at respective positions spaced apart by an angle of 60° along the circumference of the second inner body.

The third partition wall may be configured to divide the interior of the second inner body at an angle of 120° circumferentially.

The outer housing may further include protrusion portions protruding outward from an exterior circumference of the outer housing at locations corresponding to the first to the fourth outer inlets to form a space with respect to a plurality of the penetration holes formed on the first inner body and the second inner body.

The first and the second outer inlet and the first outer outlet may be located in an upper portion of the outer housing corresponding to the first inner body. The third and the fourth outer inlet and the second outer outlet may be located in a lower portion of the outer housing corresponding to the second inner body.

A heat pump system may include the multi-way coolant valve as above, a first line having a first end connected to a first outer inlet provided in the multi-way coolant valve and a second end connected to a first radiator, a second line having a first end connected to a first outer outlet provided in the multi-way coolant valve and a second end connected to the first radiator, the second line being provided with a battery module, a third line having a first end connected to a second outer inlet provided in the multi-way coolant valve and a second end connected to the second line connecting the first radiator and the battery module, a fourth line having a first end connected to a third outer inlet provided in the multi-way coolant valve and a second end connected to a second radiator, a fifth line having a first end connected to a second outer outlet provided in the multi-way coolant valve and a second end connected to the second radiator, the fifth line being provided with an electrical component and an oil cooler, and a sixth line having a first end connected to a fourth outer inlet provided in the multi-way coolant valve and a second end connected to the fifth line, where the second line is provided with a chiller connected to an air conditioner unit, where a heat-exchanger included in the air conditioner unit is provided at a location where the sixth line is connected to the fifth line, where an inner housing provided in the multi-way coolant valve is operated in a plurality of modes including a first mode, a second mode, a third mode, and a fourth mode in which the inner housing is rotated at corresponding angles within an outer housing.

In the first mode, the multi-way coolant valve may be configured to connect the first line to the second line in order to supply the coolant cooled at the first radiator to the battery module, close the third line, connect the fourth line to the fifth line in order to supply the coolant cooled at the second radiator to the electrical component and the oil cooler, close the sixth line, and operate such that the interconnected first and second lines may form an independent closed circuit with respect to the interconnected fourth and fifth lines, where the air conditioner unit is stopped in the first mode.

In the second mode, the multi-way coolant valve may be configured to close the first line, connect the second line to the third line such that the coolant having passed through the chiller is supplied to the battery module, connect the fourth line to the fifth line in order to supply the coolant cooled at the second radiator to the electrical component and the oil cooler respectively, close the sixth line, and operate such that the interconnected second and third lines may form an independent closed circuit with respect to the interconnected fourth and fifth lines, where refrigerant flows through the heat-exchanger and the chiller by an operation of the air conditioner unit in order to supply a low temperature coolant to the battery module.

In the third mode, the multi-way coolant valve may be configured to connect the first line to the second line, close the third line and the fourth line, open the sixth line such that the sixth line and the fifth line may be connected, operate such that the interconnected first and second lines may form an independent closed circuit with respect to the interconnected fifth and sixth lines, where a part of the fifth line connected to the second radiator is closed, and where refrigerant flows through the heat-exchanger by an operation of the air conditioner unit in order to recollect waste heat from the electrical component and the oil cooler.

In the fourth mode, the multi-way coolant valve may be configured to close the first line and connect the second line to the third line, close the fourth line, open the sixth line such that the sixth line and the fifth line are connected, and operate such that the interconnected second and third lines may form an independent closed circuit with respect to the interconnected fifth and sixth lines, where a part of the fifth line connected to the second radiator is closed, and where refrigerant flows through the heat-exchanger and the chiller by an operation of the air conditioner unit in order to recollect waste heat from the electrical component, the oil cooler, and the battery module.

According to a multi-way coolant valve and a heat pump system having the same according to an embodiment, by forming a plurality of coolant lines between the outer housing and the inner housing by rotating the inner housing depending on the vehicle mode, the number of valves employed in the heat pump system may be minimized, and the heat pump system may be streamlined and simplified.

In addition, according to an embodiment, the valve control may become easier since a plurality of coolant lines are formed between the outer housing and the inner housing as the inner housing rotates by a predetermined angle interval.

Furthermore, according to an embodiment, it is possible to reduce manufacturing cost and weight through simplification of an entire system, and to improve space utilization.

BRIEF DESCRIPTION OF THE DRAWINGS

The drawings are intended to be used as references for describing the exemplary embodiments of the present disclosure, and the accompanying drawings should not be construed as limiting the technical spirit of the present disclosure.

Figure 1:
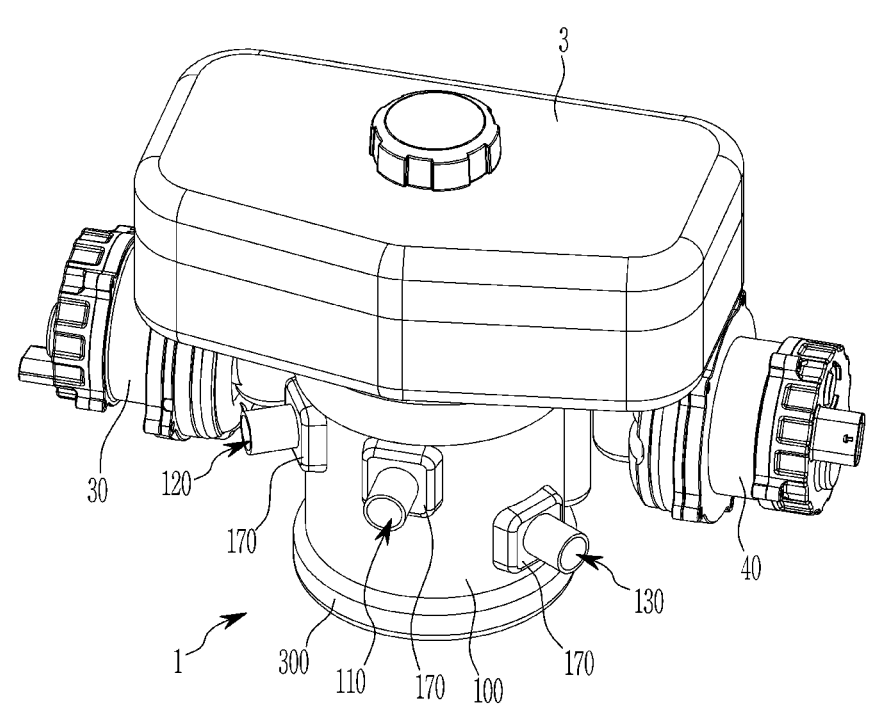
FIG. 1 is perspective view showing a state in which a reservoir tank and a water pump are combined to a multi-way coolant valve according to an embodiment.

The following reference identifiers may be used in connection with the accompanying drawings to describe exemplary embodiments of the present disclosure.

1: multi-way coolant valve
3: reservoir tank
5, 7: first and second radiators
11, 12, 13: first, second, and third lines
14, 15, 16: fourth, fifth, and sixth lines
17: electrical component
18: motor
19: battery module
30, 40: first, and second water pump
100: outer housing
110, 120, 130, 140: first, second, third, and fourth outer inlets
150, 160: first and second outer outlets
170: protrusion portion
200: inner housing
202: inner body
210, 220: first and second inner bodies
211, 212: first and second penetration holes
213, 214: third and fourth penetration holes
210a: first inner chamber
220a, 220b, 220c: second, third, and fourth inner chambers
221, 222, 223: fifth, sixth, and seventh penetration holes
224, 225, 226: eighth, ninth, and tenth penetration holes
230, 240, 250: first, second, and third partition walls

DETAILED DESCRIPTION OF ILLUSTRATIVE EMBODIMENTS

Exemplary embodiments of the present invention will hereinafter be described in detail with reference to the accompanying drawings.

Exemplary embodiments disclosed in the present specification and the constructions depicted in the drawings are only the preferred embodiments of the present disclosure, and do not cover the entire scope of the present disclosure. Therefore, it will be understood that there may be various equivalents and variations at the time of the application of this specification.

In order to clarify embodiments of the present disclosure, parts that are not related to the description will be omitted, and the same elements or equivalents are referred to with the same reference numerals throughout the specification.

Also, the size and thickness of each element are arbitrarily shown in the drawings, but embodiments of the present disclosure are not necessarily limited thereto, and in the drawings, the thickness of layers, films, panels, regions, etc., are exaggerated for clarity.

In addition, unless explicitly described to the contrary, the word "comprise" and variations such as "comprises" or "comprising" will be understood to imply the inclusion of stated elements but not the exclusion of any other elements.

Furthermore, each of terms, such as " . . . unit," " . . . means," " . . . portions," " . . . part," and " . . . member"

described in the specification, mean a unit of a comprehensive element that performs at least one function or operation.

Figure 2:
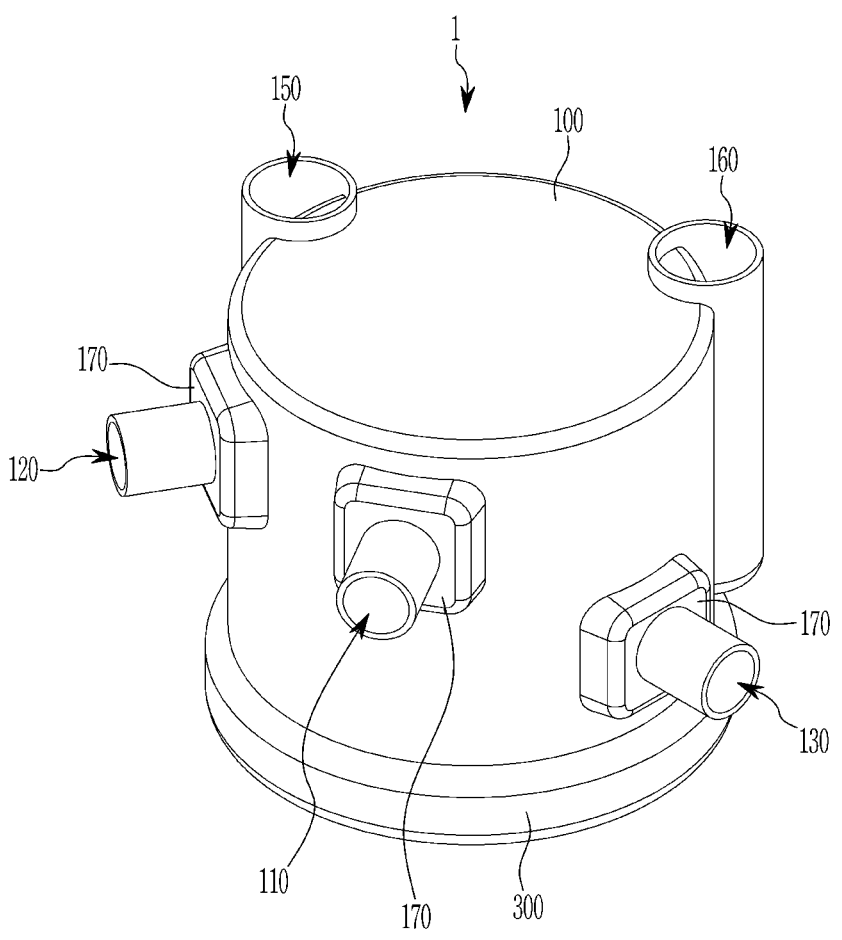
FIG. 2 is a perspective view of a multi-way coolant valve according to an embodiment.
Figure 3:
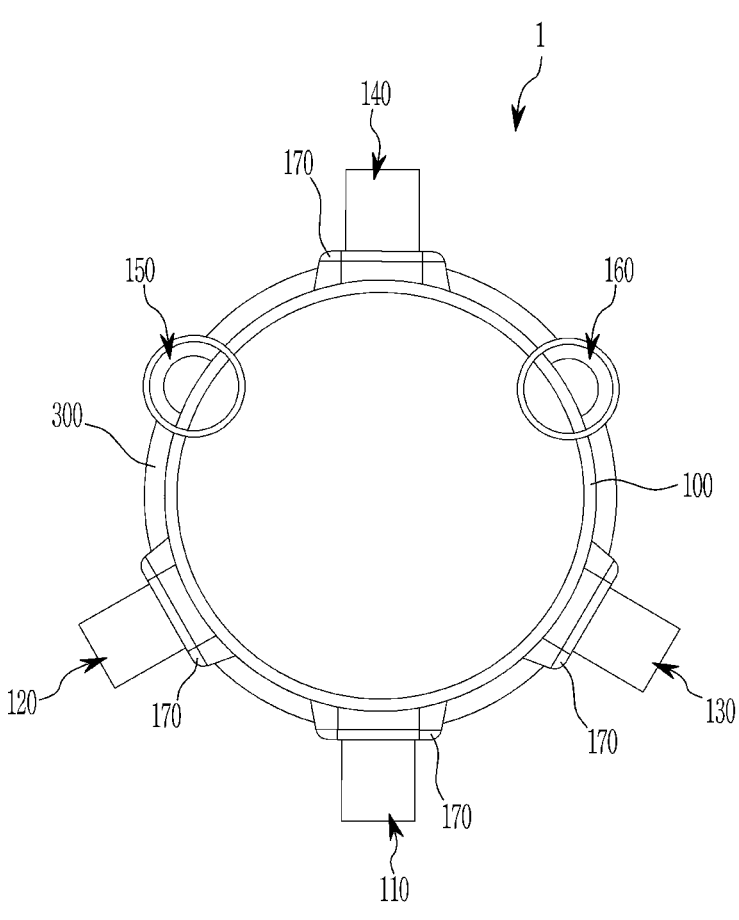
FIG. 3 is a top plan view of a multi-way coolant valve according to an embodiment.
Figure 4:
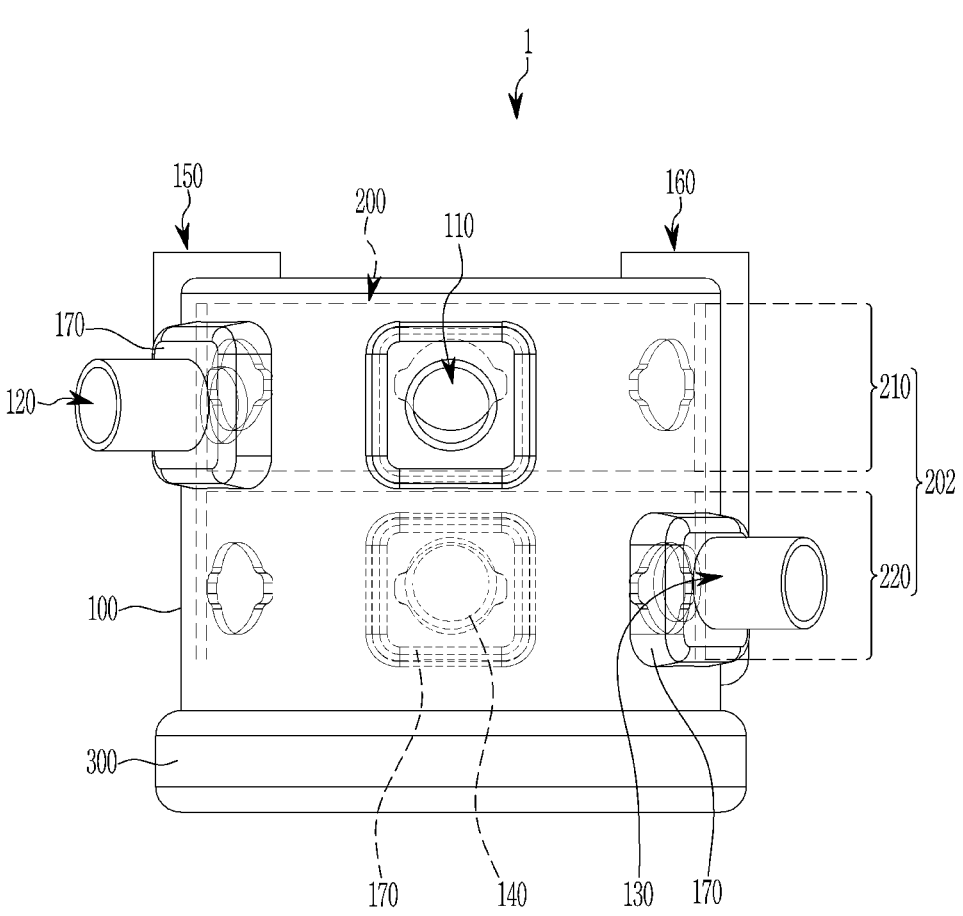
FIG. 4 is a projected front view of a multi-way coolant valve according to an embodiment.
Figure 5:
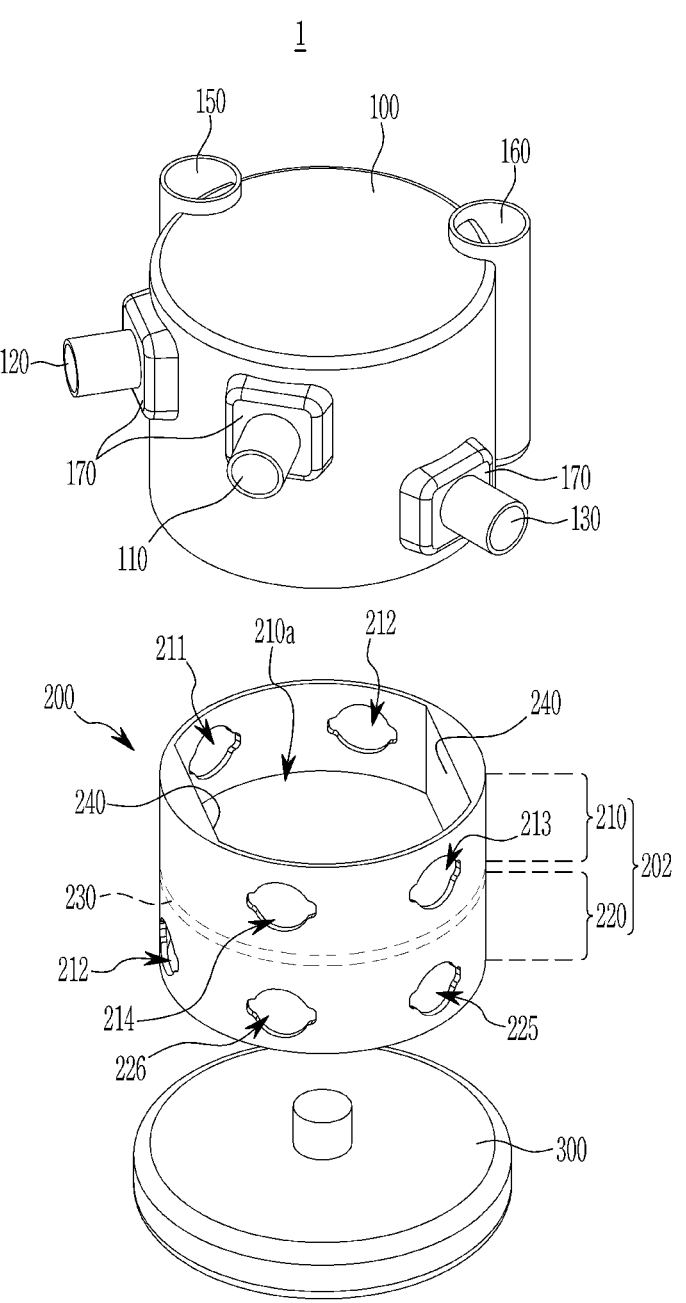
FIG. 5 is an exploded perspective view of a multi-way coolant valve according to an embodiment.

FIG. 1 is perspective view showing a state in which a reservoir tank and a water pump are combined to a multi-way coolant valve according to an embodiment. FIG. 2 is a perspective view of a multi-way coolant valve according to an embodiment. FIG. 3 is a top plan view of a multi-way coolant valve according to an embodiment. FIG. 4 is a projected front view of a multi-way coolant valve according to an embodiment. FIG. 5 is an exploded perspective view of a multi-way coolant valve according to an embodiment.

Referring to FIG. 1 to FIG. 5, a multi-way coolant valve 1 according to an embodiment may include an outer housing 100, an inner housing 200 rotatably provided within the outer housing 100, and a driving unit 300.

A reservoir tank 3 is disposed on top of the outer housing 100, and the reservoir tank 3 may be connected to the outer housing 100.

Here, a first water pump 30 and a second water pump 40 may be mounted on the reservoir tank 3, respectively.

The first water pump 30 may supply the coolant to a second line 12 and a third line 13 included in a heat pump system.

The second water pump 40 may supply the coolant to a fifth line 15 and a sixth line 16 included in the heat pump system.

In addition, the driving unit 300 is connected to a rotation center of the inner housing 200 and may selectively rotate the inner housing 200 within the outer housing 100.

That is, the driving unit 300 may generate power to rotate the inner housing 200. Accordingly, the driving unit 300 may rotate the inner housing 200 within the outer housing 100 by a predetermined angle such that the introduced coolant may flow through a plurality of flow paths.

The driving unit 300 is mounted on a lower portion of the outer housing 100, and a rotation shaft of the driving unit 300 may be connected to the rotation center of the inner housing 200.

The driving unit 300 may be realized by utilizing a step motor, a solenoid, and the like, such that the inner housing 200 may be rotated to a preset angle depending on a selected mode of the vehicle.

Hereinafter, configurations of the outer housing 100 and the inner housing 200 are described in detail with reference to the drawings.

Figure 6:
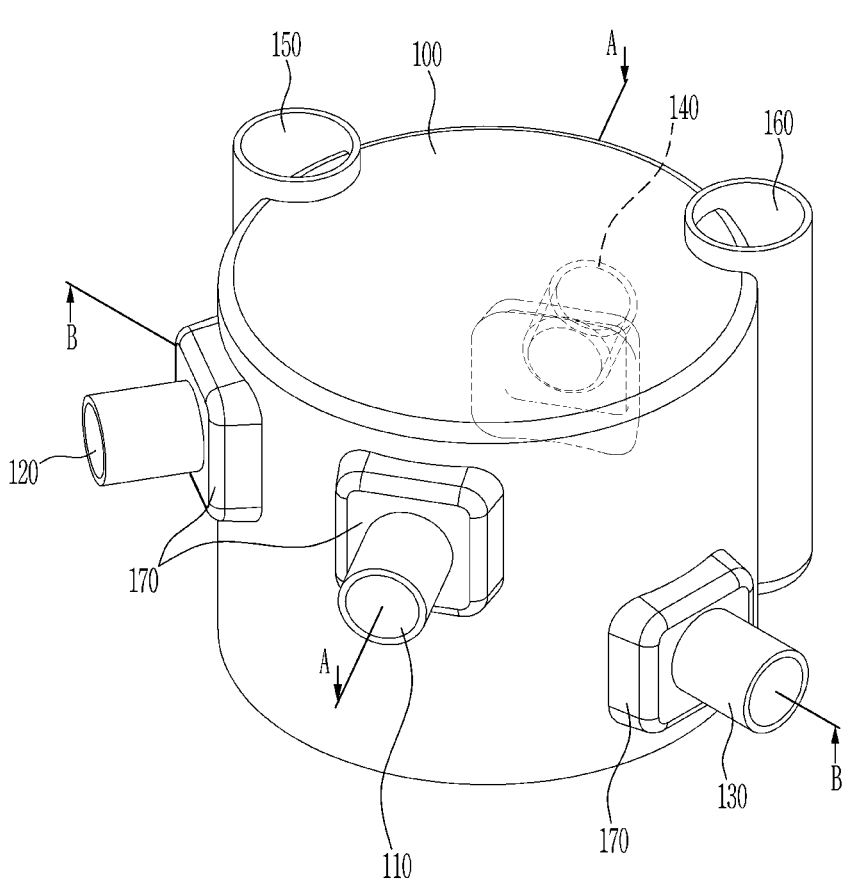
FIG. 6 is a projected perspective view of an outer housing applied to a multi-way coolant valve according to an embodiment.
Figure 7:
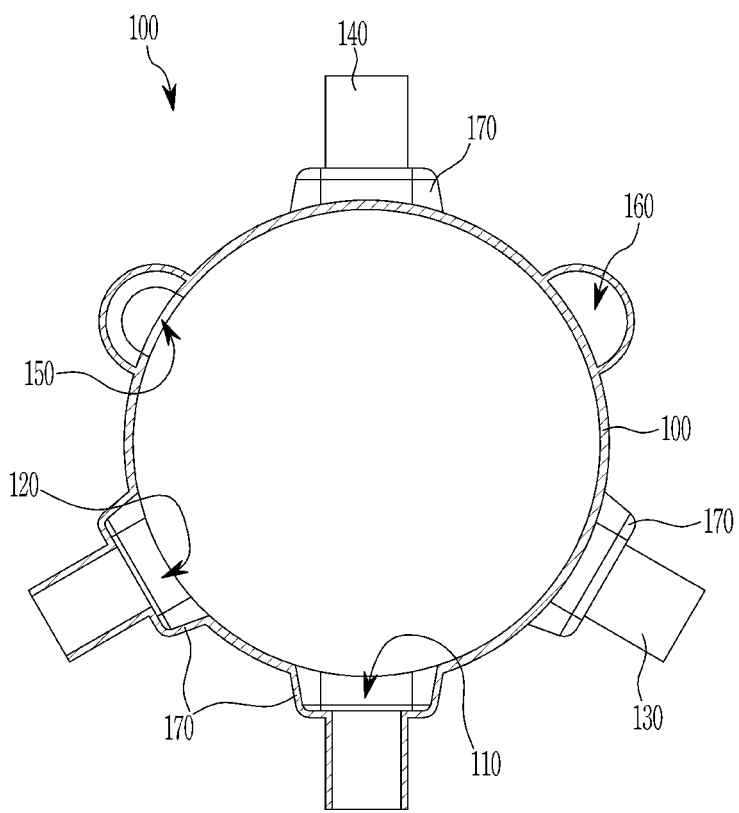
FIG. 7 is a cross-sectional view along line A-A of FIG. 6.
Figure 8:
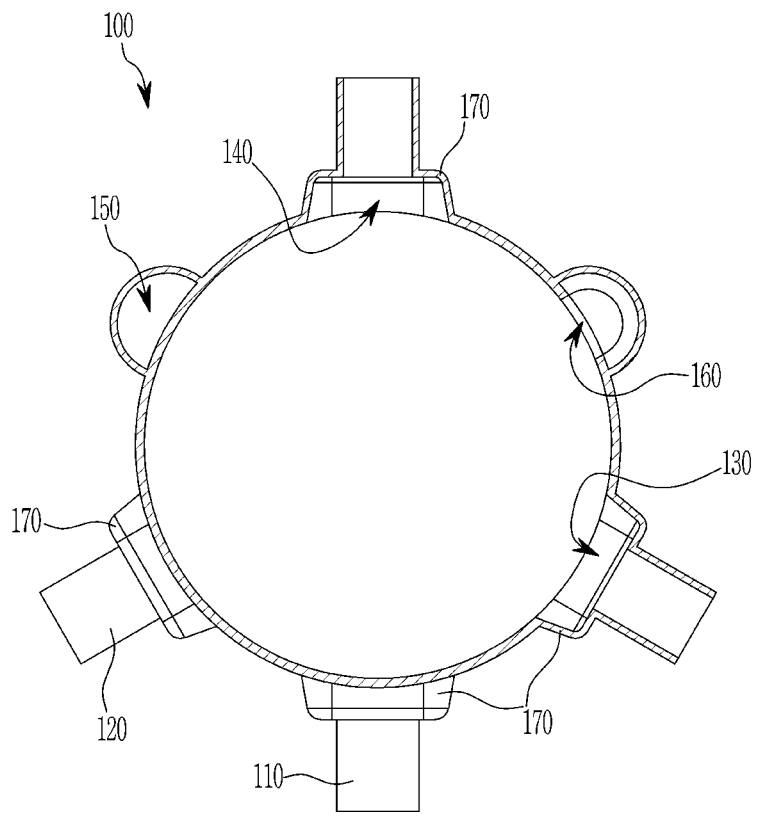
FIG. 8 is a cross-sectional view along line B-B of FIG. 6.
Figure 9:
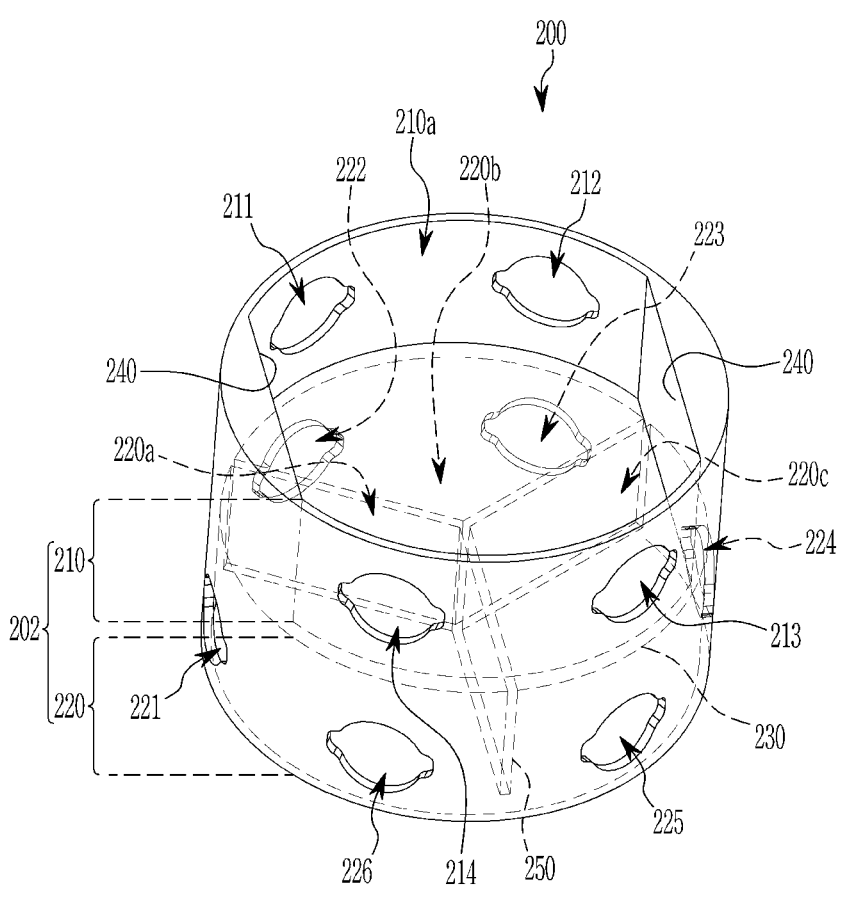
FIG. 9 is a projected perspective view of an inner housing applied to a multi-way coolant valve according to an embodiment.
Figure 10:
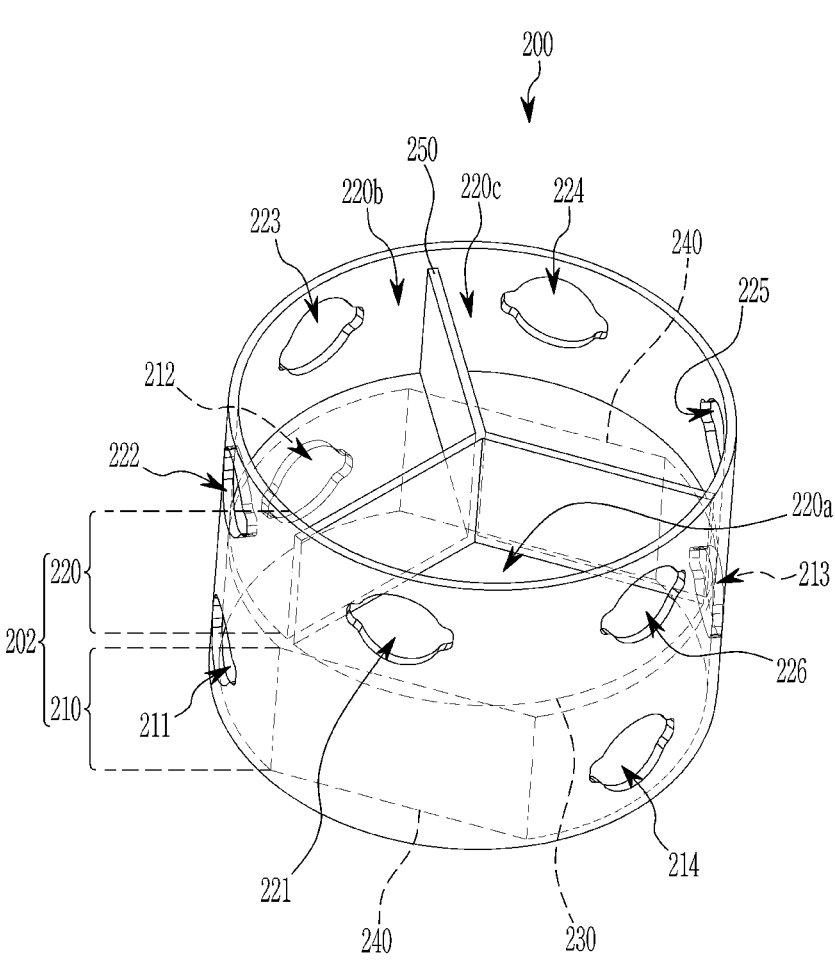
FIG. 10 is a projected bottom perspective view of an inner housing according to an embodiment.
Figure 11:
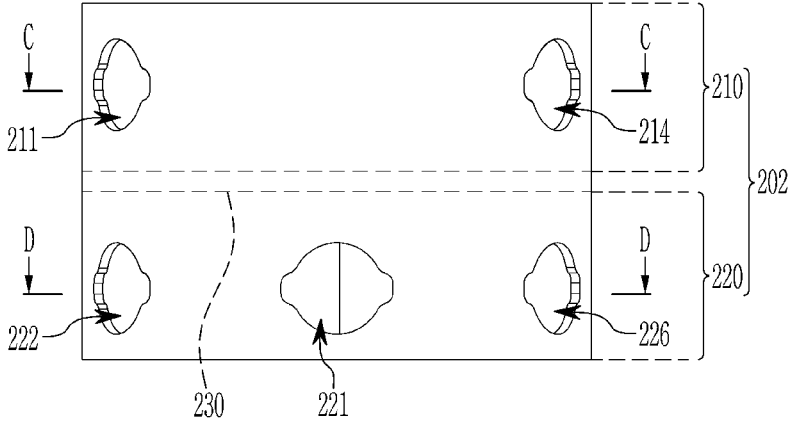
FIG. 11 is a front view of an inner housing according to an embodiment.
Figure 12:
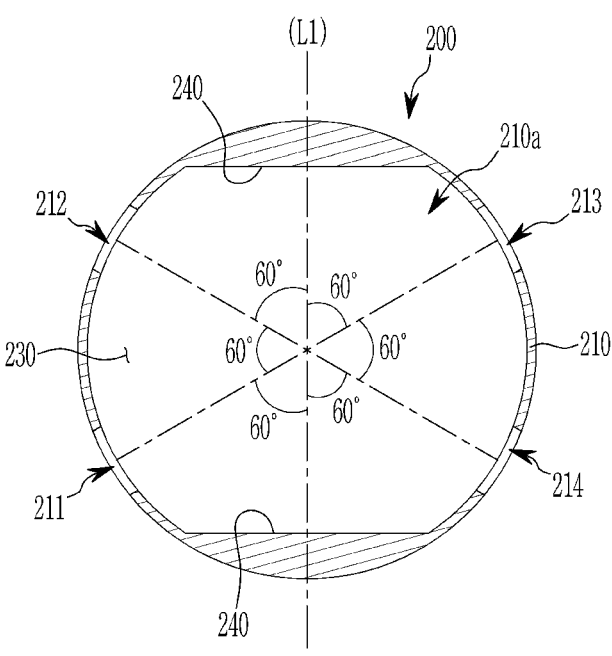
FIG. 12 is a cross-sectional view along line C-C of FIG. 11.
Figure 13:
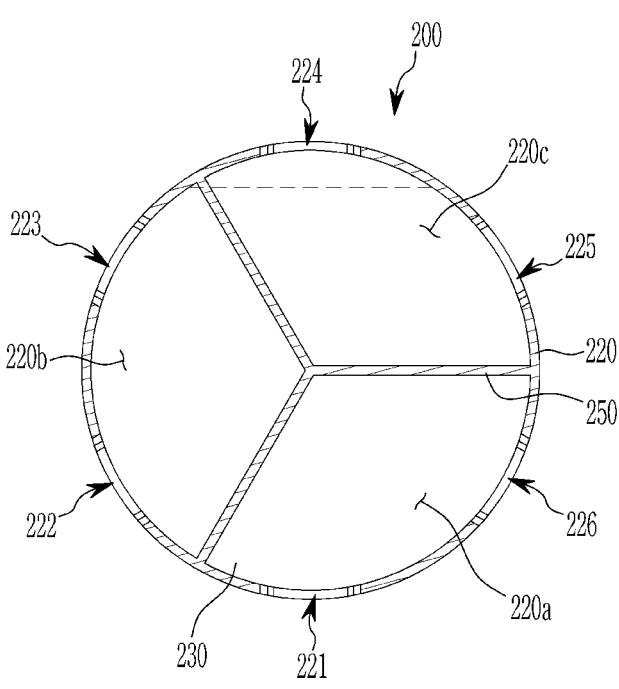
FIG. 13 is a cross-sectional view along line D-D of FIG. 11.

FIG. 6 is a projected perspective view of an outer housing applied to a multi-way coolant valve according to an embodiment. FIG. 7 is a cross-sectional view along line A-A of FIG. 6. FIG. 8 is a cross-sectional view along line B-B of FIG. 6. FIG. 9 is a projected perspective view of an inner housing applied to a multi-way coolant valve according to an embodiment. FIG. 10 is a projected bottom perspective view of an inner housing according to an embodiment. FIG. 11 is a front view of an inner housing according to an embodiment. FIG. 12 is a cross-sectional view along line C-C of FIG. 11. FIG. 13 is a cross-sectional view along line D-D of FIG. 11.

As shown in FIG. 6 to FIG. 8, the outer housing 100 is formed with a first outer inlet 110, a second outer inlet 120, a third outer inlet 130, a fourth outer inlet 140, a first outer outlet 150, a second outer outlet 160 that communicate with an interior and are formed along an exterior circumference at an equal interval.

Here, the first and second outer inlets 110 and 120 and the first outer outlet 150 may be located in the upper portion of the outer housing 100 corresponding to a first inner body 210 that is later described in further detail.

In addition, the third and fourth outer inlets 130 and 140 and the second outer outlet 160 may be located in the lower portion of the outer housing 100 corresponding to a second inner body 220 that is later described in further detail.

In addition, the first outer inlet 110, the second outer inlet 120, the third outer inlet 130, the fourth outer inlet 140, the first outer outlet 150, and the second outer outlet 160 may be formed at locations spaced apart by an angle of 60° along a circumference of the outer housing 100.

Here, the first outer outlet 150 and the second outer outlet 160 interposing the fourth outer inlet 140 may be disposed at locations spaced apart by an angle of 120° circumferentially of the outer housing 100 (refer to FIG. 7).

In the present embodiment, the inner housing 200 is rotatably provided within the outer housing 100 to selectively connect the first, second, third, and fourth outer inlets 110, 120, 130, and 140 to the first and second outer outlets 150 and 160, and may be partitioned into two stages through which the coolant may flow.

As shown in FIG. 9 to FIG. 13, the inner housing 200 may include an inner body 202, a first partition wall 230, a second partition wall 240, a third partition wall 250, and a plurality of penetration holes.

First, an upper side of the inner body 202 and a lower surface of the inner body 202 are opened, and thus the inner body 202 is formed in a hollow cylindrical shape.

The first partition wall 230 may partition the inner body 202 into the first inner body 210 and the second inner body 220 with respect to a height direction.

That is, the first inner body 210 may be located in an upper portion of the inner body 202, and the second inner body 220 may be located in a lower portion of the inner body 202.

The second partition wall 240 may be provided as a pair and may be formed in parallel at both sides of the first inner body 210 to form a first inner chamber 210a within the first inner body 210 (refer to FIG. 9 and FIG. 12).

In the present embodiment, the third partition wall 250 may divide an interior of the second inner body 220 into second, third, and fourth inner chambers 220a, 220b, and 220c spaced apart at a preset angle circumferentially around a rotation center (refer to FIG. 10 and FIG. 13).

Here, the third partition wall 250 may divide the interior of the second inner body 220 at an angle of 120° circumferentially.

In addition, the plurality of penetration holes may be formed along exterior circumferences of the first inner body 210 and the second inner body 220.

The plurality of penetration holes may include first to fourth penetration holes 211, 212, 213, and 214 formed on the first inner body 210 and fifth to tenth penetration holes 221, 222, 223, 224, 225, and 226 formed on the second inner body 220.

First, the first to fourth penetration holes 211, 212, 213, and 214 may be formed at locations spaced apart by a preset angle along a circumference of the first inner body 210, excluding a portion formed with the second partition wall 240.

Here, as shown in FIG. 12, the first penetration hole 211 may be formed at a location spaced apart by an angle of 60° with respect to a virtual center line L1 passing through the center of the inner housing 200.

The second penetration hole 212 may be formed at a location spaced apart from the first penetration hole 211 by an angle of 60°.

In the present embodiment, the third penetration hole 213 may be formed at a location spaced apart from the second penetration hole 212 by an angle of 120°.

In addition, the fourth penetration hole 214 may be formed at a location spaced apart from the third penetration hole 213 by an angle of 60°.

In addition, as shown in FIG. 13, the fifth to tenth penetration holes 221, 222, 223, 224, 225, and 226 may be formed at locations spaced apart by a preset angle along a circumference of the second inner body 220.

In the present embodiment, the fifth to tenth penetration holes 221, 222, 223, 224, 225, and 226 may be formed at respective positions spaced apart by an angle of 60° along the circumference of the second inner body 220.

Here, the first and second penetration holes 211 and 212 may be disposed on a same line with the sixth and seventh penetration holes 222 and 223 along the height direction of the inner housing 200.

In addition, the third and fourth penetration holes 213 and 214 may be disposed on a same line with the ninth and tenth penetration holes 225 and 226 along the height direction of the inner housing 200 (refer to FIG. 10 and FIG. 11).

Meanwhile, in the present embodiment, the first to fourth penetration holes 211, 212, 213, and 214 may communicate with the first inner chamber 210a.

The fifth and tenth penetration holes 221 and 226 may communicate with the second inner chamber 220a.

The sixth and seventh penetration holes 222 and 223 may communicate with the third inner chamber 220b.

The eighth and ninth penetration holes 224 and 225 may communicate with the fourth inner chamber 220c.

Here, the outer housing 100 may further include protrusion portions 170 protruding outward from an exterior circumference of the outer housing 100 at locations corresponding to the first, second, third, and fourth outer inlets 110, 120, 130, and 140, to form a space with respect to the first to tenth penetration holes 211, 212, 213, 214, 221, 222, 223, 224, 225, and 226 formed in the first inner body 210 and the second inner body 220.

One penetration hole among the first to fourth penetration holes 211, 212, 213, and 214, or one penetration hole among the fifth to tenth penetration holes 221, 222, 223, 224, 225, and 226 may be positioned to the protrusion portions 170.

That is, when the inner housing 200 is rotated by a preset angle by the driving unit 300, selected penetration holes from among the first to tenth penetration holes 211, 212, 213, 214, 221, 222, 223, 224, 225, and 226 may be positioned to the protrusion portions 170.

Accordingly, the multi-way coolant valve 1 may form various coolant lines by selectively connecting the first to fourth outer inlets 110, 120, 130, and 140 to the first to second outer outlets 150 and 160.

That is, when the inner housing 200 rotates by a preset interval according to the selected mode, the first outer inlet 110 or the second outer inlet 120 may selectively communicate with the first outer outlet 150.

In addition, the third outer inlet 130 or the fourth outer inlet 140 may selectively communicate with the second outer outlet 160.

Hereinafter, the operation and action of the multi-way coolant valve 1 according to an embodiment configured as above is described in detail with reference to FIG. 14 to FIG. 21.

In the present embodiment, the selected mode may include a first mode, a second mode, a third mode, and a fourth mode in which the inner housing 200 rotates within the outer housing 100 by corresponding angles by the operation of the driving unit 300.

That is, the multi-way coolant valve 1 may be operated in the first mode to fourth mode.

First, an operation in the first mode is described with reference to FIG. 14 and FIG. 15.

Figure 14:
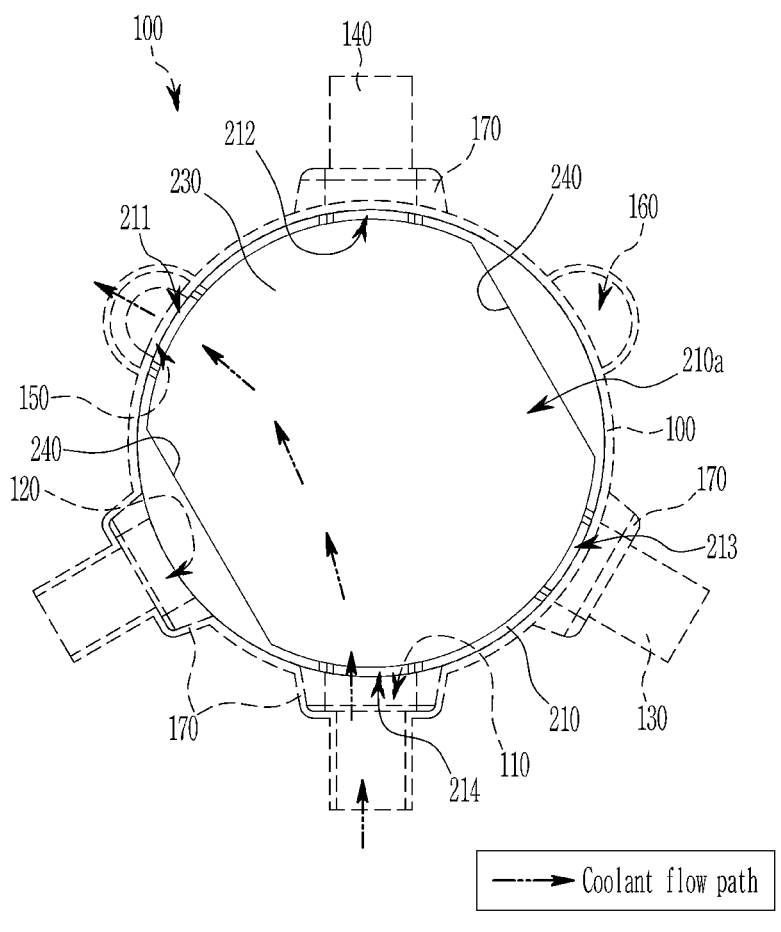
FIG. 14 and FIG. 15 are drawings illustrating an operation in a first mode of a multi-way coolant valve according to an embodiment.
Figure 15:
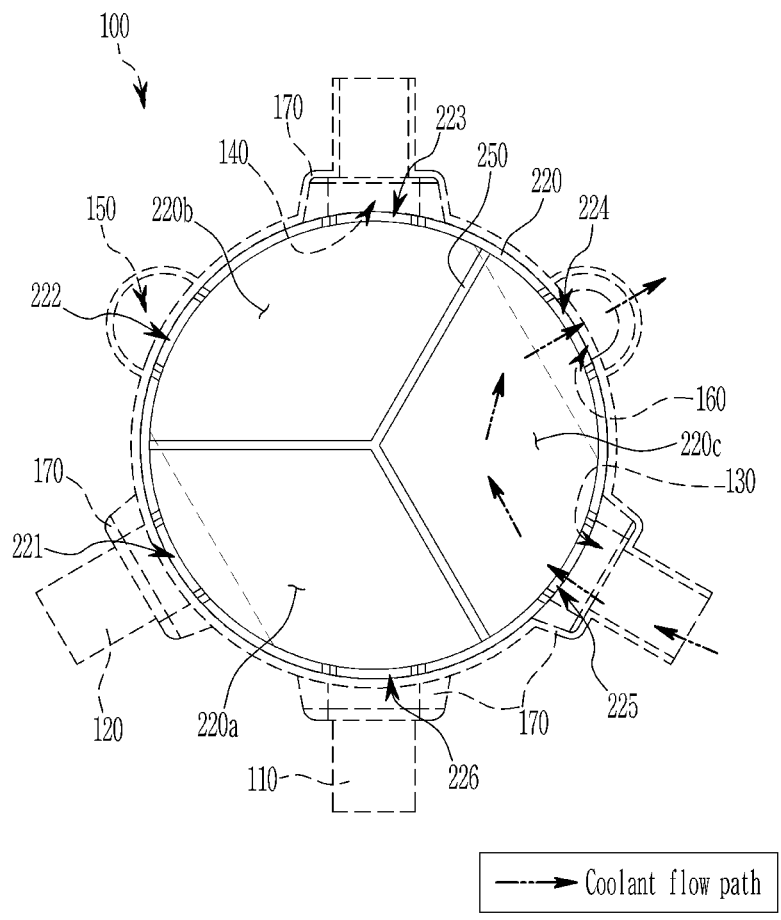

FIG. 14 and FIG. 15 are drawings illustrating an operation in a first mode of a multi-way coolant valve according to an embodiment.

Referring to FIG. 14 and FIG. 15, in the first mode, the inner housing 200 may be rotated such that, by the operation of the driving unit 300, the fourth penetration hole 214 is positioned to the first outer inlet 110, and the first penetration hole 211 is positioned to the first outer outlet 150.

Accordingly, the first outer inlet 110 communicates with the first outer outlet 150 through the first inner chamber 210a.

That is, as shown in FIG. 14, the fourth penetration hole 214 communicating with the first inner chamber 210a may be located at the first outer inlet 110.

In addition, the first penetration hole 211 may be located at the first outer outlet 150.

At this time, the second penetration hole 212 and the third penetration hole 213 may be located in a closed interior circumference of the outer housing 100.

Then, the coolant introduced through the first outer inlet 110 may flow through the first inner chamber 210a and be discharged through the first outer outlet 150.

Simultaneously, the third outer inlet 130 communicates with the second outer outlet 160 through the fourth inner chamber 220c.

That is, as shown in FIG. 15, the ninth penetration hole 225 communicating with the fourth inner chamber 220c may be located at the third outer inlet 130. In addition, the eighth penetration hole 224 may be located at the second outer outlet 160.

Then, the coolant introduced through the third outer inlet 130 may flow through the fourth inner chamber 220c and be discharged through the second outer outlet 160.

In the present embodiment, an operation in the second mode is described with reference to FIG. 16 and FIG. 17.

Figure 16:
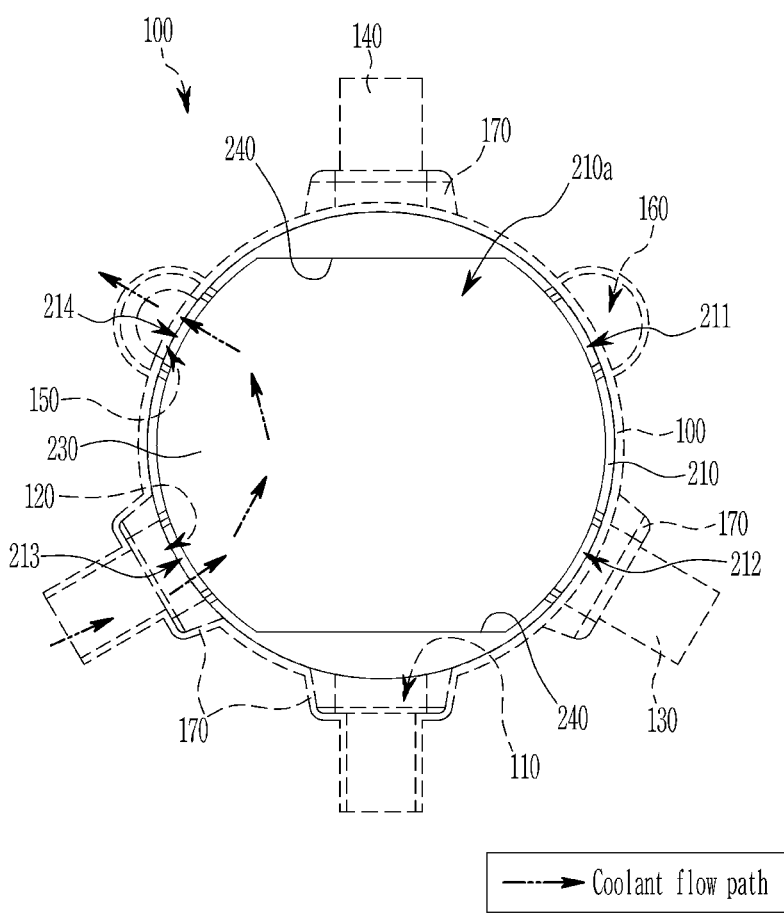
FIG. 16 and FIG. 17 are drawings illustrating an operation in a second mode of a multi-way coolant valve according to an embodiment.
Figure 17:
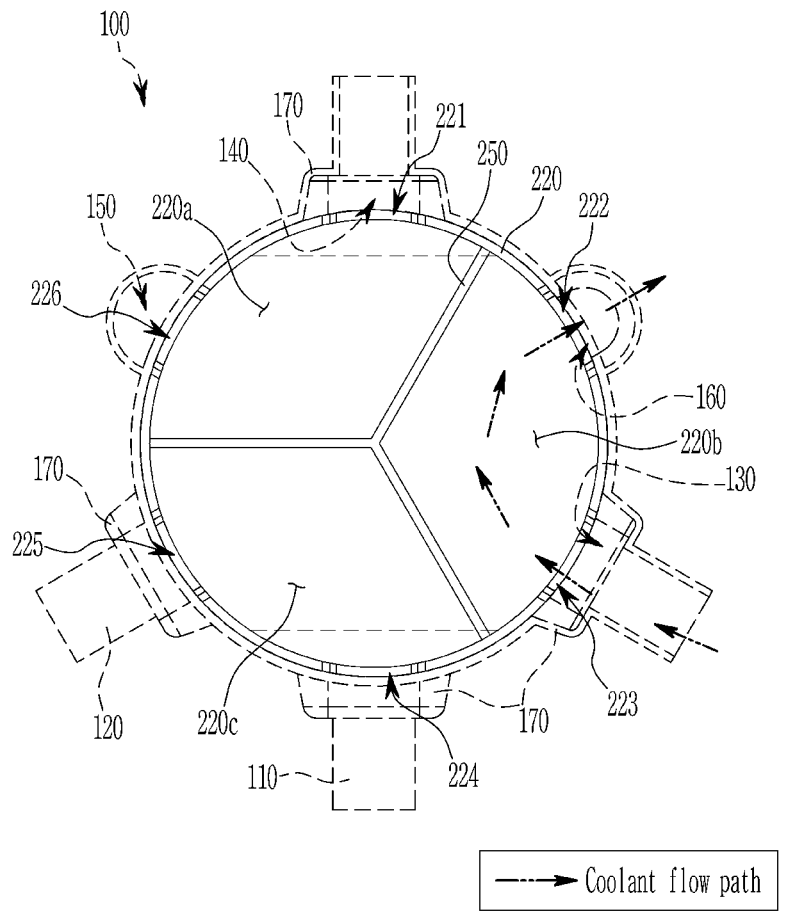

FIG. 16 and FIG. 17 are drawings illustrating an operation in a second mode of a multi-way coolant valve according to an embodiment.

Referring to FIG. 16 and FIG. 17, in the second mode, the inner housing 200 may be rotated such that, by the operation of the driving unit 300, the third penetration hole 213 is positioned to the second outer inlet 120, and the fourth penetration hole 214 is positioned to the first outer outlet 150.

Accordingly, the second outer inlet 120 communicates with the first outer outlet 150 through the first inner chamber 210a.

That is, as shown in FIG. 16, the third penetration hole 213 communicating with the first inner chamber 210a may be located at the second outer inlet 120. In addition, the fourth penetration hole 214 may be located at the first outer outlet 150.

At this time, the first penetration hole 211 and the second penetration hole 212 may be located in the closed interior circumference of the outer housing 100.

Then, the coolant introduced through the second outer inlet 120 may flow through the first inner chamber 210a and be discharged through the first outer outlet 150.

Simultaneously, the third outer inlet 130 communicates with the second outer outlet 160 through the third inner chamber 220b.

That is, as shown in FIG. 17, the seventh penetration hole 223 communicating with the third inner chamber 220*b* may be located at the third outer inlet 130. In addition, the sixth penetration hole 222 may be located at the second outer outlet 160.

Then, the coolant introduced through the third outer inlet 130 may flow through the third inner chamber 220*b* and be discharged through the second outer outlet 160.

In the present embodiment, an operation in the third mode is described with reference to FIG. 18 and FIG. 19.

Figure 18:
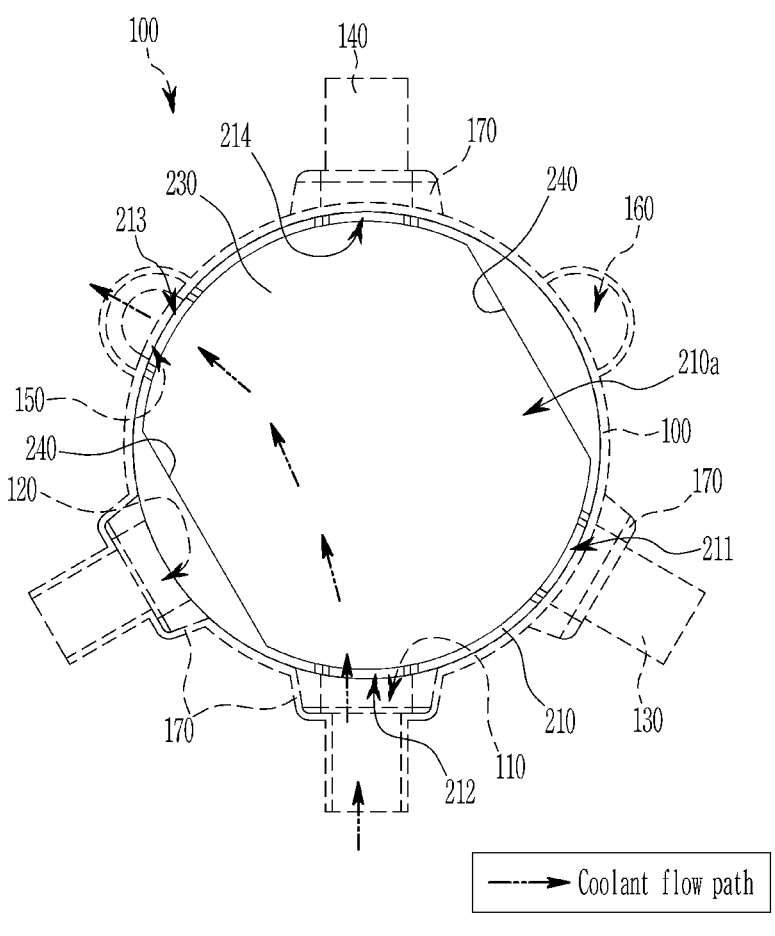
FIG. 18 and FIG. 19 are drawings illustrating an operation in a third mode of a multi-way coolant valve according to an embodiment.
Figure 19:
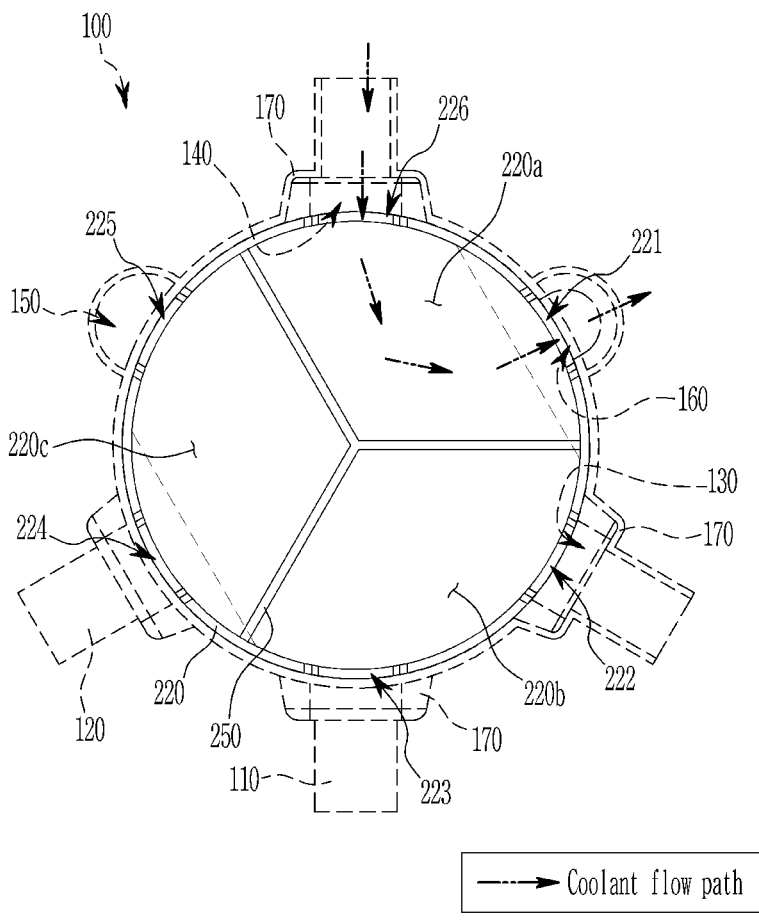

FIG. 18 and FIG. 19 are drawings illustrating an operation in a third mode of a multi-way coolant valve according to an embodiment.

Referring to FIG. 18 and FIG. 19, in the third mode, the inner housing 200 may be rotated such that, by the operation of the driving unit 300, the second penetration hole 212 is positioned to the first outer inlet 110, and the third penetration hole 213 is positioned to the first outer outlet 150.

Accordingly, the first outer inlet 110 communicates with the first outer outlet 150 through the first inner chamber 210*a*.

That is, as shown in FIG. 18, the second penetration hole 212 communicating with the first inner chamber 210*a* may be located at the first outer inlet 110. In addition, the third penetration hole 213 may be located at the first outer outlet 150.

At this time, the first penetration hole 211 and the fourth penetration hole 214 may be located in the closed interior circumference of the outer housing 100.

Then, the coolant introduced through the first outer inlet 110 may flow through the first inner chamber 210*a* and be discharged through the first outer outlet 150.

Simultaneously, the fourth outer inlet 140 communicates with the second outer outlet 160 through the second inner chamber 220*a*.

That is, as shown in FIG. 19, the tenth penetration hole 226 communicating with the second inner chamber 220*a* may be located at the fourth outer inlet 140. In addition, the fifth penetration hole 221 may be located at the second outer outlet 160.

Then, the coolant introduced through the fourth outer inlet 140 may flow through the second inner chamber 220*a* and be discharged through the second outer outlet 160.

In the present embodiment, an operation in the fourth mode is described with reference to FIG. 20 and FIG. 21.

Figure 20:
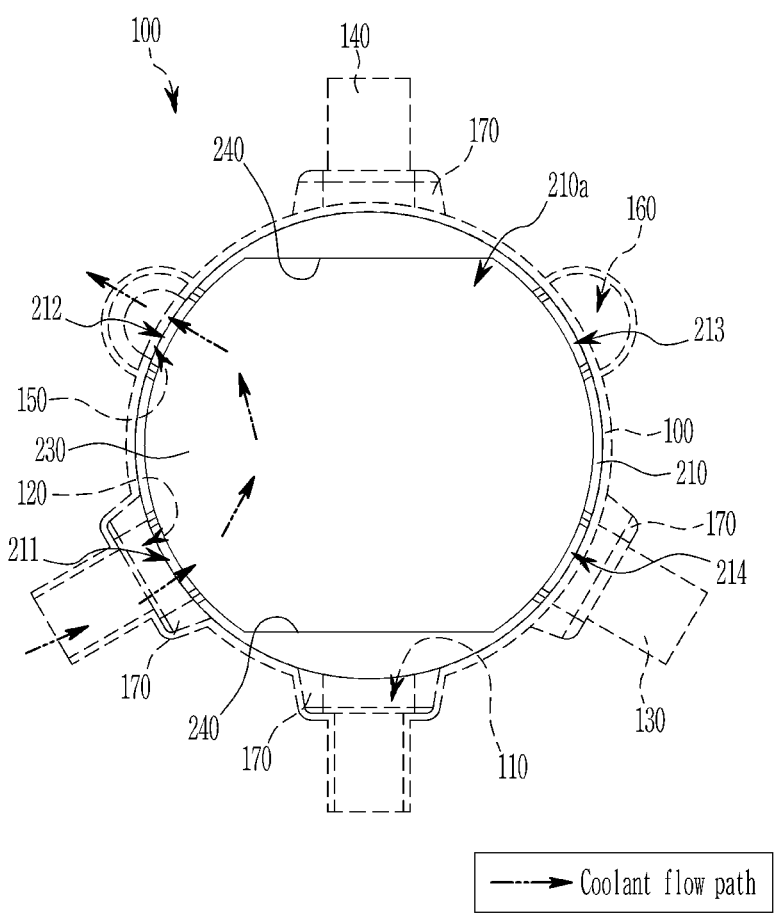
FIG. 20 and FIG. 21 are drawings illustrating an operation in a fourth mode of a multi-way coolant valve according to an embodiment.
Figure 21:
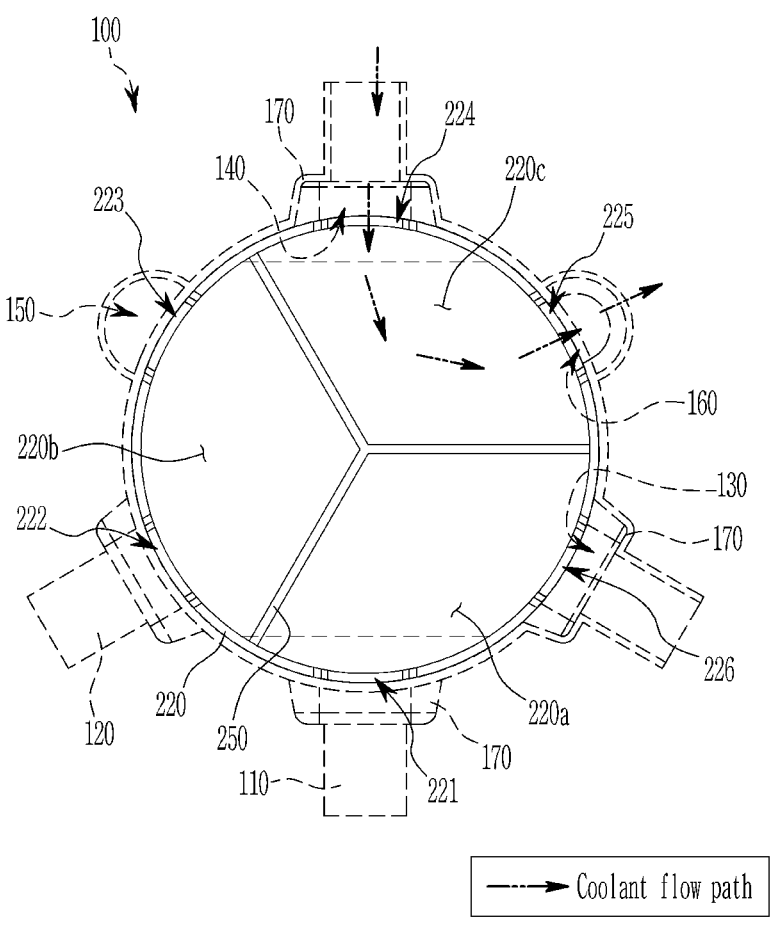

FIG. 20 and FIG. 21 are drawings illustrating an operation in a fourth mode of a multi-way coolant valve according to an embodiment.

Referring to FIG. 20 and FIG. 21, in the fourth mode, the inner housing 200 may be rotated such that, by the operation of the driving unit 300, the first penetration hole 211 is positioned to the second outer inlet 120, and the second penetration hole 212 is positioned to the first outer outlet 150.

Accordingly, the second outer inlet 120 communicates with the first outer outlet 150 through the first inner chamber 210*a*.

That is, as shown in FIG. 20, the first penetration hole 211 communicating with the first inner chamber 210*a* may be located at the second outer inlet 120. In addition, the second penetration hole 212 may be located at the first outer outlet 150.

At this time, the third penetration hole 213 and the fourth penetration hole 214 may be located in the closed interior circumference of the outer housing 100.

Then, the coolant introduced through the second outer inlet 120 may flow through the second inner chamber 220*a* and be discharged through the first outer outlet 150.

Simultaneously, the fourth outer inlet 140 communicates with the second outer outlet 160 through the fourth inner chamber 220*c*.

That is, as shown in FIG. 21, the eighth penetration hole 224 communicating with the fourth inner chamber 220*c* may be located at the fourth outer inlet 140. In addition, the ninth penetration hole 225 may be located at the second outer outlet 160.

Then, the coolant introduced through the fourth outer inlet 140 may flow through the fourth inner chamber 220*c* and be discharged through the second outer outlet 160.

Therefore, according to the multi-way coolant valve 1 enabling the first mode to the fourth mode, by forming a plurality of coolant lines between the outer housing 100 and the inner housing 200 by rotating the inner housing 200 depending on the vehicle mode, the number of valves employed in the heat pump system may be minimized, and the heat pump system may be streamlined and simplified.

Hereinafter, the heat pump system applied with the multi-way coolant valve 1 configured as described above is described in detail with reference to FIG. 22.

Figure 22:
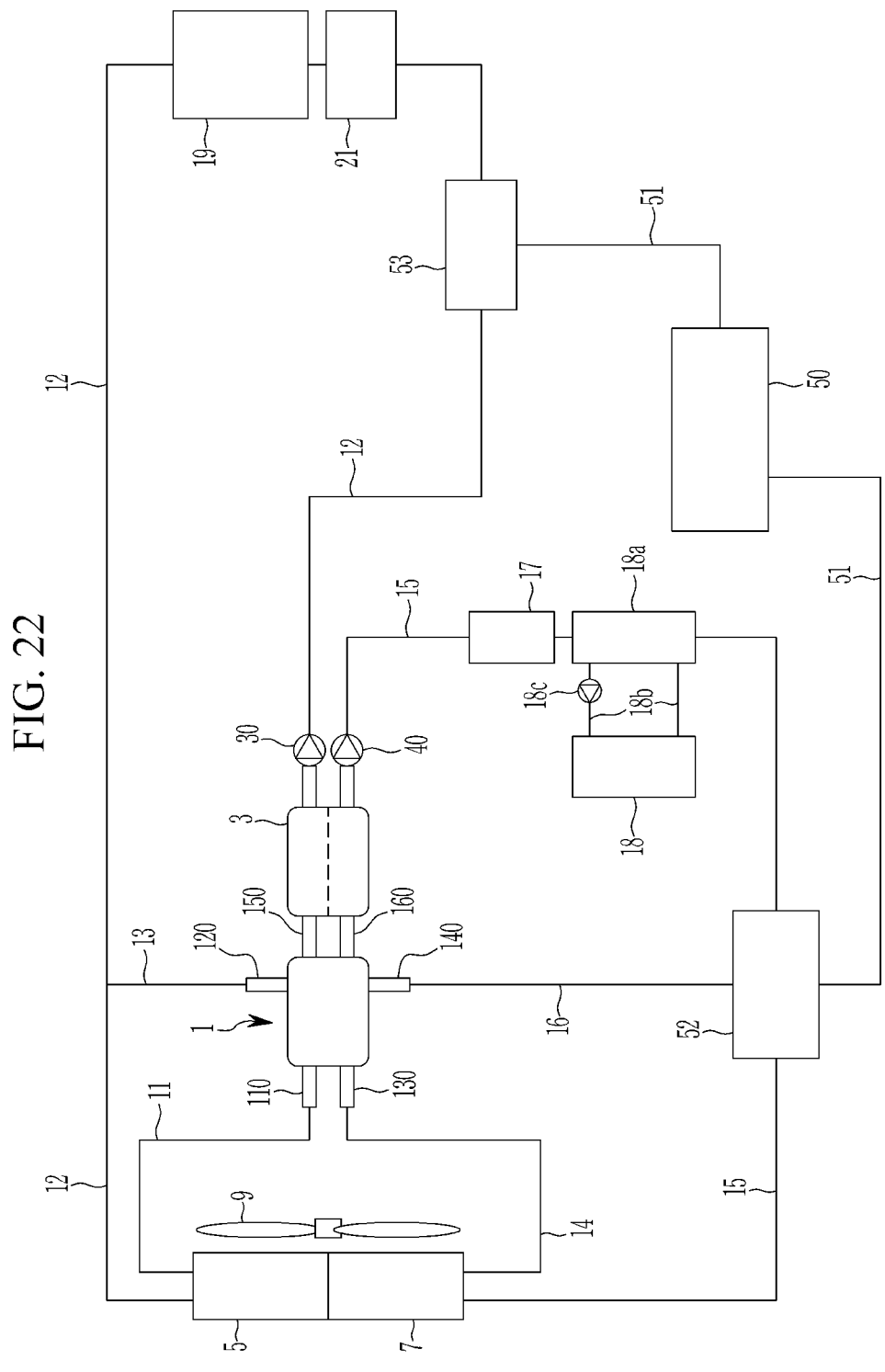
FIG. 22 is a block diagram of a heat pump system applied with a multi-way coolant valve according to an embodiment.

FIG. 22 is a block diagram of the heat pump system applied with a multi-way coolant valve according to an embodiment.

Referring to FIG. 22, the heat pump system may be applied to an electric vehicle and may include the multi-way coolant valve 1 and a first line 11, the second line 12, the third line 13, a fourth line 14, the fifth line 15, and the sixth line 16 that are connected to the multi-way coolant valve 1.

First, a first end of the first line 11 may be connected to the first outer inlet 110, and a second end of the first line 11 may be connected to a first radiator 5.

A first end of the second line 12 may be connected to the first outer outlet 150 provided in the multi-way coolant valve 1. A second end of the second line 12 may be connected to the first radiator 5.

The second line 12 may be provided with a battery module 19. The battery module 19 supplies power to an electrical component 17 and a drive motor 18 and is formed in a water-cooled structure cooled by the coolant flowing along the second line 12.

Meanwhile, the second line 12 may be provided with a coolant heater 21.

When heating of the battery module 19 is required, the coolant circulating the second line 12 is heated by turning on the coolant heater 21, and thereby the coolant with increased temperature may be supplied to the battery module 19.

The coolant heater 21 may be an electrical heater operated according to supply of power.

In the present embodiment, a first end of the third line 13 may be connected to the second outer inlet 120 provided in the multi-way coolant valve 1. A second end of the third line 13 may be connected to the second line 12 connecting the first radiator 5 and the battery module 19.

A first end of the fourth line 14 may be connected to the third outer inlet 130 provided in the multi-way coolant valve 1. A second end of the fourth line 14 may be connected to a second radiator 7.

Here, the first and second radiators 5 and 7 may be integrally formed but partitioned to prevent mixing of their coolants.

The first and second radiators 5 and 7 are disposed at a front of the vehicle, a cooling fan 9 is provided at a rear of the vehicle, and the coolant is cooled by the operation of the cooling fan 9 and the heat-exchange with ambient air.

In the present embodiment, a first end of the fifth line 15 may be connected to the second outer outlet 160 provided in the multi-way coolant valve 1. A second end of the fifth line 15 may be connected to the second radiator 7.

The fifth line 15 may be provided with the electrical component 17 and an oil cooler 18a.

The electrical component 17 includes an inverter and an on-board charger (OBC). On the other hand, the electrical component 17 may further include an electric power control unit (EPCU) or an autonomous driving controller.

The electrical component 17 may be cooled in the water-cooled scheme by the coolant supplied to the fifth coolant line 15.

Accordingly, when the waste heat of the electrical component is desired to be recollected in the heating mode of the vehicle, heat generated from the power control apparatus, the inverter, the charger, or the autonomous driving controller may be recollected.

In addition, the oil cooler 18a is connected to cool the drive motor 18 and may be selectively cooled by the coolant supplied through the fifth line 15.

The drive motor 18 is connected to the oil cooler 18a through an oil line 18b, and the oil line 18b may be provided with a hydraulic pump 18c.

While only one drive motor 18 has been described in the present embodiment, it is not limited thereto, and it may be understood that more than one drive motor 18 may be provided, for example, for front wheels and rear wheels, respectively.

In addition, a first end of the sixth line 16 may be connected to the fourth outer inlet 140 provided in the multi-way coolant valve 1. A second end of the sixth line 16 may be connected to the fifth line 15.

Here, the reservoir tank 3 may be connected to the first and second outer outlets 150 and 160 of the multi-way coolant valve 1. The reservoir tank 3 may be partitioned such that the coolant flowing through the second and fifth lines 12 and 15 may not be mixed.

Accordingly, the second line 12 and the fifth line 15 may be connected to the multi-way coolant valve 1 through the reservoir tank 3.

In the present embodiment, a heat-exchanger 52 included in an air conditioner unit 50 is provided in the fifth line 15. The coolant flows through the interior of the heat-exchanger 52, which is connected to the air conditioner unit 50 through a refrigerant line 51.

The heat-exchanger 52 may condense or evaporate the refrigerant through heat-exchange with the coolant supplied through the fifth line 15 depending on the vehicle mode. That is, the heat-exchanger 52 may be a water-cooled heat-exchanger through which the coolant may flow.

In addition, a chiller 53 connected to the air conditioner unit 50 is provided in the second line 12. The coolant flows through the interior of the chiller 53, and the chiller 53 is connected to the air conditioner unit 50 through the refrigerant line 51.

The chiller 53 may adjust the temperature of the coolant by enabling the coolant selectively flowing through the chiller 53 to heat-exchange with the refrigerant supplied from the air conditioner unit 50. Here, the chiller 53 may be a water-cooled heat-exchanger through which the coolant may flow.

In the heat pump system configured as above, the multi-way coolant valve 1 may be operated in the first mode to the fourth mode in which the inner housing 200 is rotated within the outer housing 100 by the driving unit 300 at the corresponding angles.

That is, the multi-way coolant valve 1 may be operated in a selected mode selected from the first mode to the fourth mode.

First, in the first mode, while the air conditioner unit 50 is not operated, the electrical component 17, the oil cooler 18a, and the battery module 19 may be cooled by using the respective coolants cooled at the first and second radiators 5 and 7.

In the second mode, in a vehicle cooling mode, the electrical component 17 and the oil cooler 18a may be cooled by using the coolant cooled at the second radiator 7, and the battery module 19 may be cooled by using the coolant having heat-exchange in the chiller 53.

In the third mode, in a vehicle heating mode, the waste heat generated at the electrical component 17 and the oil cooler 18a may be recollected by using the coolant circulating in the fifth line 15, and the recollected waste heat may be used for heating of the vehicle interior.

In addition, in the fourth mode, in the vehicle heating mode, the waste heat generated at the electrical component 17, the oil cooler 18a, and the battery module 19 is recollected by using the coolant circulating in the second and third lines 12 and 13 and the fifth and sixth lines 15 and 16, and the recollected waste heat may be used for heating of the vehicle interior.

Hereinafter, operation and action of the heat pump system configured as described above is described in detail with reference to FIG. 23 to FIG. 26.

First, an operation in the first mode is described with reference to FIG. 23.

Figure 23:
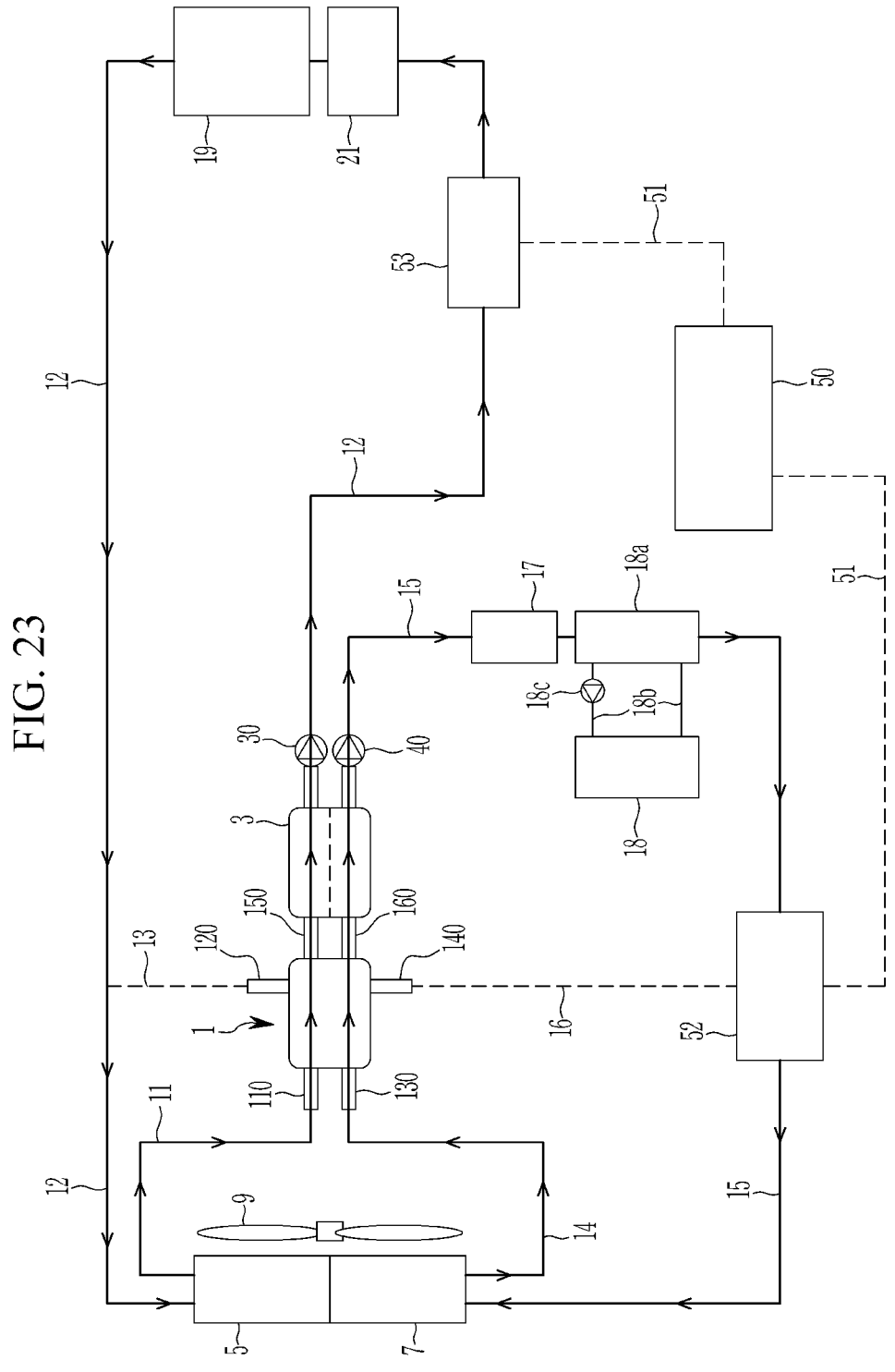
FIG. 23 is a drawing illustrating an operation in a first mode of a heat pump system according to an embodiment.

FIG. 23 is a drawing illustrating an operation in a first mode of the heat pump system according to an embodiment.

In the first mode, while the air conditioner unit 50 is not operated, the electrical component 17, the oil cooler 18a, and the battery module 19 may be cooled by using the respective coolants cooled at the first and second radiators 5 and 7.

Referring to FIG. 23, in the first mode, the multi-way coolant valve 1 may connect the first line 11 to the second line 12 in order to supply the coolant cooled at the first radiator 5 to the battery module 19.

At this time, the multi-way coolant valve 1 may close the third line 13.

That is, the first outer inlet 110 may communicate with the first outer outlet 150 through the first inner chamber 210a such that the first line 11 and the second line 12 may be interconnected.

Then, the coolant introduced through the first outer inlet 110 along the first line 11 from the first radiator 5 may flow through the first inner chamber 210a and be discharged through the first outer outlet 150 connected to the second line 12.

The coolant discharged through the first outer outlet 150 into the second line 12 may pass through the battery module 19 and then flow back to the first radiator 5.

Meanwhile, the multi-way coolant valve 1 may connect the fourth line 14 to the fifth line 15 in order to supply the coolant cooled at the second radiator 7 to the electrical component 17 and the oil cooler 18a.

At this time, the multi-way coolant valve 1 may close the sixth line 16.

That is, the third outer inlet 130 may communicate with the second outer outlet 160 through the fourth inner chamber 220*c* such that the fourth line 14 and the fifth line 15 may be interconnected.

Then, the coolant introduced through the third outer inlet 130 along the fourth line 14 from the second radiator 7 may pass through the fourth inner chamber 220*c* and be discharged through the second outer outlet 160 connected to the fifth line 15.

The coolant discharged through the second outer outlet 160 into the fifth line 15 may flow back to the second radiator 7 after passing through the electrical component 17 and the oil cooler 18*a*.

In other words, in the first mode, the multi-way coolant valve 1 may operate such that the interconnected first and second lines 11 and 12 may form an independent closed circuit with respect to the interconnected fourth and fifth lines 14 and 15.

Accordingly, the coolant cooled at the first radiator 5 may circulate along the first line 11 and the second line 12 by the operation of the first water pump 30 and may cool the battery module 19 to prevent overheating.

In addition, the coolant cooled at the second radiator 7 may circulate along the fourth line 14 and the fifth line 15 by the operation of the second water pump 40 and may cool the electrical component 17 and the oil cooler 18*a* to prevent overheating.

In the present embodiment, an operation in the second mode is described with reference to FIG. 24.

Figure 24:
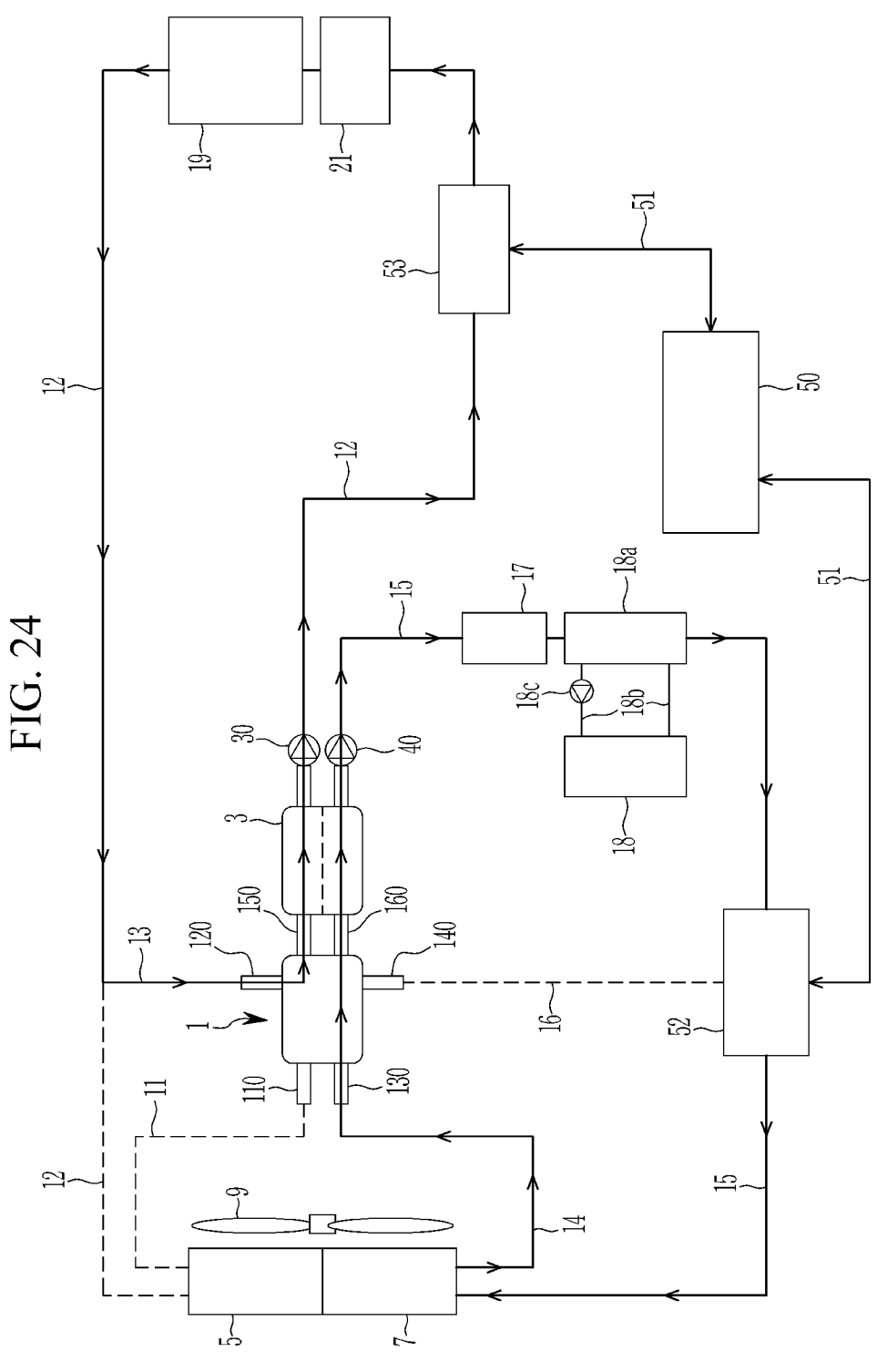
FIG. 24 is a drawing illustrating an operation in a second mode of a heat pump system according to an embodiment.

FIG. 24 is a drawing illustrating an operation in a second mode of the heat pump system according to an embodiment.

In the second mode, in the vehicle cooling mode, the electrical component 17 and the oil cooler 18*a* may be cooled by using the coolant cooled at the second radiator 7, and the battery module 19 may be cooled by using the coolant having heat-exchange in the chiller 53.

Referring to FIG. 24, in the second mode, the multi-way coolant valve 1 may close the first line 11.

In addition, the multi-way coolant valve 1 may connect the second line 12 to the third line 13 such that the coolant having passed through the chiller 53 is supplied to the battery module 19.

That is, the second outer inlet 120 may communicate with the first outer outlet 150 through the first inner chamber 210*a* such that the second line 12 and the third line 13 may be interconnected.

Then, the coolant introduced through the second outer inlet 120 along the third line 13 from the multi-way coolant valve 1 may flow through the first inner chamber 210*a* and be discharged through the first outer outlet 150 connected to the second line 12.

Accordingly, the coolant may circulate along the second and third lines 12 and 13 by the operation of the first water pump 30.

Meanwhile, the multi-way coolant valve 1 may connect the fourth line 14 to the fifth line 15 in order to supply the coolant cooled at the second radiator 7 to the electrical component 17 and the oil cooler 18*a*.

Simultaneously, the multi-way coolant valve 1 may close the sixth line 16.

Then, the coolant introduced through the third outer inlet 130 along the fourth line 14 from the second radiator 7 may pass through the third inner chamber 220*b* and be discharged through the second outer outlet 160 connected to the fifth line 15.

The coolant discharged through the second outer outlet 160 into the fifth line 15 may flow back to the second radiator 7 after passing through the electrical component 17 and the oil cooler 18*a* by the operation of the second water pump 40.

Accordingly, the coolant cooled at the second radiator 7 may circulate along the fourth line 14 and the fifth line 15 by the operation of the second water pump 40 and may cool the electrical component 17 and the oil cooler 18*a* to prevent overheating.

In other words, in the second mode, the multi-way coolant valve 1 may operate such that the interconnected second and third lines 12 and 13 may form an independent closed circuit with respect to the interconnected fourth and fifth lines 14 and 15.

That is, when the multi-way coolant valve 1 is operated in the second mode, the second outer inlet 120 communicates with the first outer outlet 150 through the first inner chamber 210*a* such that the second line 12 is connected to the third line 13.

Simultaneously, the third outer inlet 130 communicates with the second outer outlet 160 through the third inner chamber 220*b* such that the fourth line 14 is connected to the fifth line 15.

Here, in the vehicle cooling mode, the refrigerant may circulate through the heat-exchanger 52 and the chiller 53 along the refrigerant line 51 such that the air conditioner unit 50 may supply a low temperature coolant to the battery module 19.

The chiller 53 may adjust the temperature of the coolant by enabling the coolant introduced through the second line 12 to heat-exchange with the refrigerant.

Accordingly, the low temperature coolant completed with the heat-exchange with the refrigerant in the chiller 53 is introduced to the battery module 19 along the second line 12, and the battery module 19 may be efficiently cooled.

In the present embodiment, an operation in the third mode is described with reference to FIG. 25.

Figure 25:
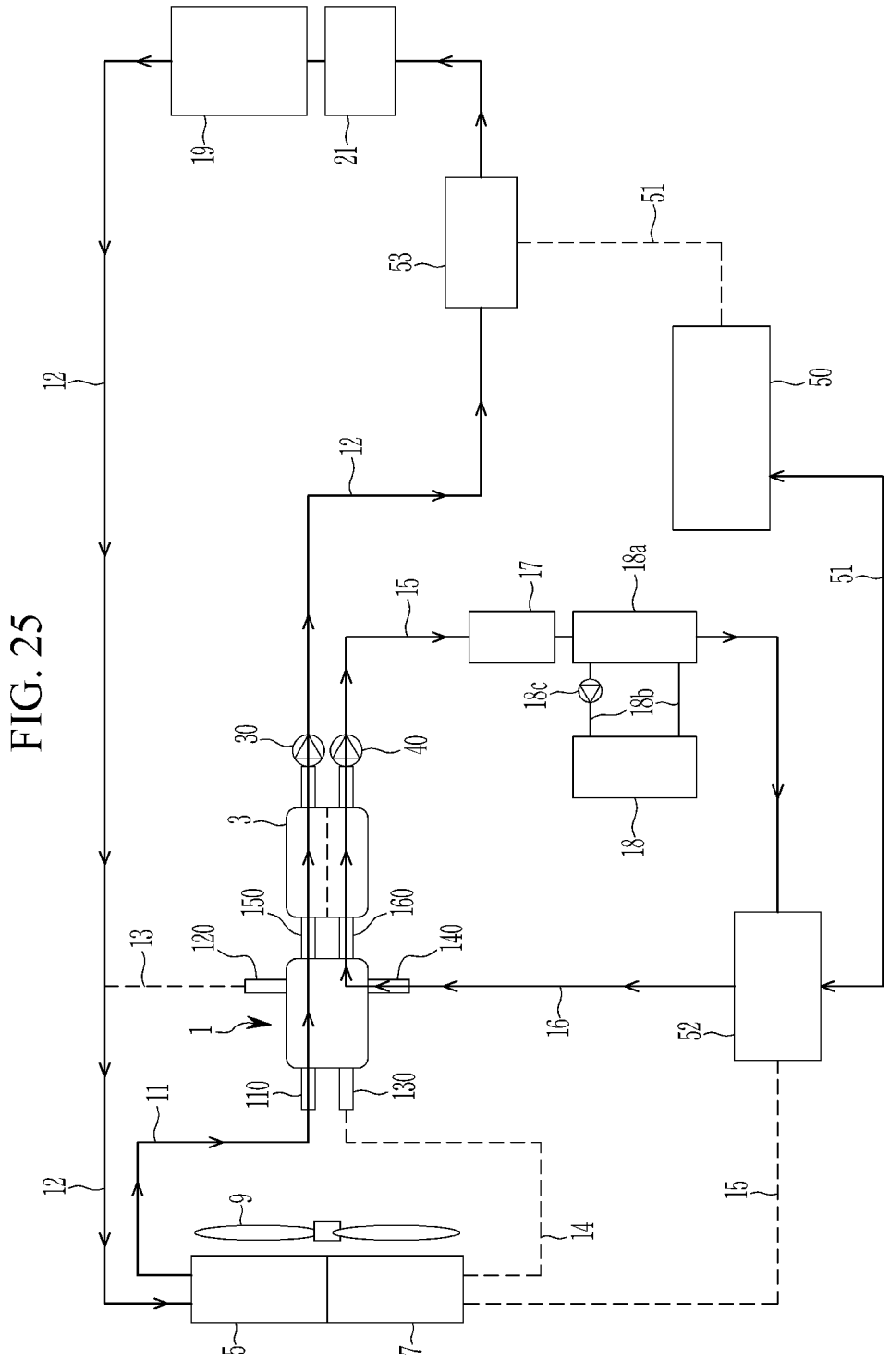
FIG. 25 is a drawing illustrating an operation in a third mode of a heat pump system according to an embodiment.

FIG. 25 is a drawing illustrating an operation in a third mode of the heat pump system according to an embodiment.

In the third mode, in the vehicle heating mode, the waste heat generated at the electrical component 17 and the oil cooler 18*a* may be recollected by using the coolant circulating the fifth line 15, and the recollected waste heat may be used for heating of the vehicle interior.

Referring to FIG. 25, in the third mode, the multi-way coolant valve 1 may connect the first line 11 to the second line 12.

Simultaneously, the multi-way coolant valve 1 may close the third line 13 and the fourth line 14.

That is, the first outer inlet 110 communicates with the first outer outlet 150 through the first inner chamber 210*a* such that the first line 11 and the second line 12 may be interconnected.

Then, the coolant introduced through the first outer inlet 110 along the first line 11 from the first radiator 5 may flow through the first inner chamber 210*a* and be discharged through the first outer outlet 150 connected to the second line 12.

The coolant discharged through the first outer outlet 150 into the second line 12 may pass through the battery module 19 and then flow back to the first radiator 5.

That is, the coolant may circulate along the first and second lines 11 and 12 by the operation of the first water pump 30.

Meanwhile, the multi-way coolant valve 1 may open the sixth line 16 such that the sixth line 16 and the fifth line 15 may be connected.

Here, a part of the fifth line 15 connected to the second radiator 7 may be closed.

That is, the fourth outer inlet 140 communicates with the second outer outlet 160 through the second inner chamber 220a such that the fifth line 15 and the sixth line 16 may be connected.

Then, the coolant introduced through the fourth outer inlet 140 may flow through the second inner chamber 220a and be discharged through the second outer outlet 160.

The coolant discharged through the second outer outlet 160 into the fifth line 15 may pass through the electrical component 17 and the oil cooler 18a and then flow to the fourth outer inlet 140 along the sixth line 16.

Accordingly, the coolant may circulate along the fifth line 15 and the sixth line 16 by the operation of the second water pump 40.

By such an operation, in the third mode, the multi-way coolant valve 1 may operate such that the interconnected first and second lines 11 and 12 may form an independent closed circuit with respect to the interconnected fifth and sixth lines 15 and 16.

Here, the refrigerant flows through the heat-exchanger 52 by the operation of the air conditioner unit 50, to recollect the waste heat from the electrical component 17 and the oil cooler 18a.

That is, the coolant circulating along the fifth and sixth lines 15 and 16 increases in temperature while cooling the electrical component 17 and the oil cooler 18a. The coolant with increased temperature flows into the heat-exchanger 52.

At this time, the waste heat from the coolant is recollected through the heat-exchange between the refrigerant and the coolant in the heat-exchanger 52, and the recollected waste heat may be used for heating of the vehicle interior.

In the present embodiment, an operation in the fourth mode is described with reference to FIG. 26.

Figure 26:
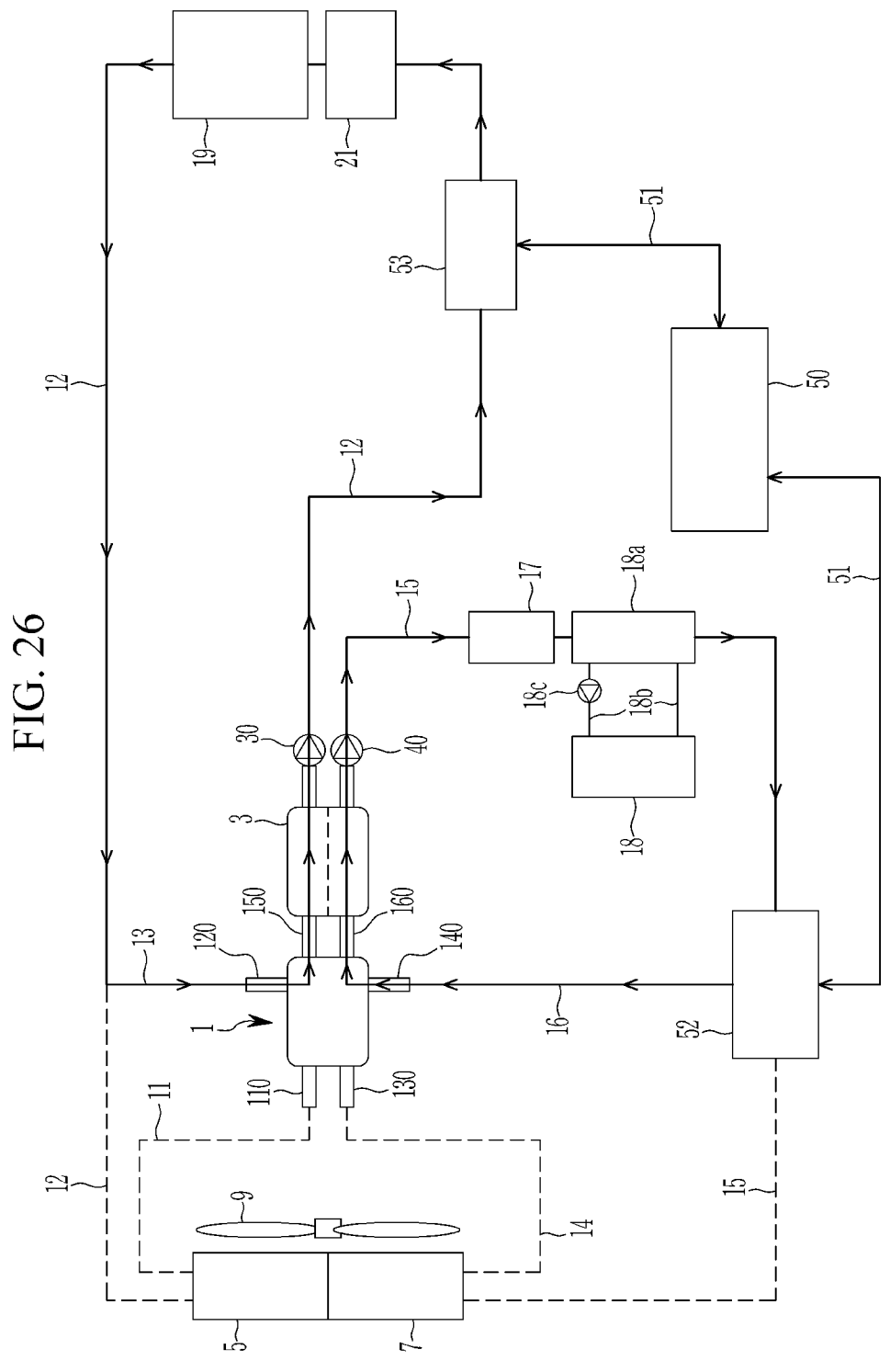
FIG. 26 is a drawing illustrating an operation in a fourth mode of a heat pump system according to an embodiment.

FIG. 26 is a drawing illustrating an operation in a fourth mode of the heat pump system according to an embodiment.

In the fourth mode, in the vehicle heating mode, the waste heat generated at the electrical component 17, the oil cooler 18a, and the battery module 19 is recollected by using the coolant circulating the second and third lines 12 and 13 and the fifth and sixth lines 15 and 16, and the recollected waste heat may be used for heating of the vehicle interior.

Referring to FIG. 26, in the fourth mode, the multi-way coolant valve 1 may close the first line 11.

In addition, the multi-way coolant valve 1 may connect the second line 12 to the third line 13 such that the coolant having passed through the chiller 53 is supplied to the battery module 19.

That is, the second outer inlet 120 may communicate with the first outer outlet 150 through the first inner chamber 210a such that the second line 12 and the third line 13 may be interconnected.

Then, the coolant introduced through the second outer inlet 120 along the third line 13 from the multi-way coolant valve 1 may flow through the first inner chamber 210a and be discharged through the first outer outlet 150 connected to the second line 12.

Accordingly, the coolant may circulate along the second and third lines 12 and 13 by the operation of the first water pump 30.

Meanwhile, the multi-way coolant valve 1 may close the fourth line 14. In addition, the multi-way coolant valve 1 may open the sixth line 16 such that the sixth line 16 and the fifth line 15 may be connected.

Here, a part of the fifth line 15 connected to the second radiator 7 may be closed.

That is, the fourth outer inlet 140 communicates with the second outer outlet 160 through the fourth inner chamber 220c such that the fifth line 15 and the sixth line 16 may be connected.

Then, the coolant introduced through the fourth outer inlet 140 may flow through the fourth inner chamber 220c and be discharged through the second outer outlet 160.

The coolant discharged through the second outer outlet 160 into the fifth line 15 may pass through the electrical component 17 and the oil cooler 18a and then flow to the fourth outer inlet 140 along the sixth line 16.

Accordingly, the coolant may circulate along the fifth line 15 and the sixth line 16 by the operation of the second water pump 40.

By such an operation, in the fourth mode, the multi-way coolant valve 1 may operate such that the interconnected second and third lines 12 and 13 may form an independent closed circuit with respect to the interconnected fifth and sixth lines 15 and 16.

Here, the refrigerant flows through the heat-exchanger 52 by the operation of the air conditioner unit 50 to recollect the waste heat from the electrical component 17 and the oil cooler 18a.

That is, the coolant circulating along the fifth and sixth lines 15 and 16 increases in temperature while cooling the electrical component 17 and the oil cooler 18a. The coolant with increased temperature flows into the heat-exchanger 52.

At this time, the waste heat from the coolant is recollected through the heat-exchange between the refrigerant and the coolant in the heat-exchanger 52, and the recollected waste heat may be used for heating of the vehicle interior.

Here, the refrigerant flows through the heat-exchanger 52 and the chiller 53 by the operation of the air conditioner unit 50 to recollect the waste heat from the electrical component 17, the oil cooler 18a, and the battery module 19.

That is, the coolant circulating along the second and third lines 12 and 13 and the fifth and sixth lines 15 and 16 increases in temperature while cooling the electrical component 17, the oil cooler 18a, and the battery module 19. The coolant with increased temperature flows into the heat-exchanger 52 and the chiller 53.

At this time, the waste heat from the coolant is recollected through the heat-exchange between the refrigerant and the coolant in the heat-exchanger 52 and the chiller 53, and the recollected waste heat may be used for heating of the vehicle interior.

Therefore, according to the multi-way coolant valve 1 according to an embodiment and the heat pump system having the same, by forming a plurality of coolant lines between the outer housing 100 and the inner housing 200 by rotating the inner housing 200 depending on the vehicle mode, the number of valves employed in the heat pump system may be minimized, and the heat pump system may be streamlined and simplified.

In addition, according to an embodiment, the valve control may become easier since a plurality of coolant lines are formed between the outer housing 100 and the inner housing 200 as the inner housing 200 rotates by a predetermined angle interval.

Furthermore, according to an embodiment, it is possible to reduce manufacturing cost and weight through simplification of an entire system, and to improve space utilization.

While this invention has been described in connection with what is presently considered to be practical exemplary embodiments, it is to be understood that the invention is not limited to the disclosed embodiments. On the contrary, it is intended to cover various modifications and equivalent arrangements included within the spirit and scope of the appended claims.

What is claimed is:

1. A multi-way coolant valve comprising:
an outer housing comprising four inlets, a first outer inlet, a second outer inlet, a third outer inlet, and a fourth outer inlet, and two outlets, a first outer outlet and a second outer outlet;
an inner housing rotatably provided within the outer housing and configured to define a coolant flow path, wherein the inner housing is partitioned into two stages through which coolant flows; and
a driver connected to a first rotation center of the inner housing and configured to selectively rotate the inner housing within the outer housing, wherein, as the inner housing rotates by a preset interval according to a selected mode of a vehicle, the first outer inlet or the second outer inlet selectively communicates with the first outer outlet, and the third outer inlet or the fourth outer inlet selectively communicates with the second outer outlet,
wherein the inner housing comprises:
an inner body having a cylindrical shape with an open upper and an open lower side,
a first partition wall configured to partition the inner body into a first inner body and a second inner body along a height direction of the inner housing,
a pair of second partition walls disposed in parallel at both sides of the inner body to define a first inner chamber within the first inner body,
a third partition wall configured to divide an interior of the second inner body into second, third, and fourth inner chambers spaced apart at a first preset angle circumferentially around a second rotation center, and
a plurality of penetration holes disposed along exterior circumferences of the first inner body and the second inner body.

2. The multi-way coolant valve of claim 1, wherein the plurality of penetration holes comprises:
first, second, third, and fourth penetration holes disposed at locations spaced apart by a second preset angle along an exterior circumference of the first inner body, excluding a portion defined by the second partition walls; and
fifth, sixth, seventh, eighth, ninth, and tenth penetration holes disposed at locations spaced apart by a third preset angle along an exterior circumference of the second inner body.

3. The multi-way coolant valve of claim 2, wherein:
the first, second, third, and fourth penetration holes communicate with the first inner chamber;
the fifth and tenth penetration holes communicate with the second inner chamber;
the sixth and seventh penetration holes communicate with the third inner chamber; and
the eighth and ninth penetration holes communicate with the fourth inner chamber.

4. The multi-way coolant valve of claim 3, wherein a mode is selected from a plurality of modes comprising a first mode, a second mode, a third mode, and a fourth mode in which the inner housing is configured to rotate within the outer housing by corresponding angles.

5. The multi-way coolant valve of claim 4, wherein in the first mode:
the first outer inlet communicates with the first outer outlet through the first inner chamber; and
the third outer inlet communicates with the second outer outlet through the fourth inner chamber.

6. The multi-way coolant valve of claim 5, wherein in the second mode:
the second outer inlet communicates with the first outer outlet through the first inner chamber; and
the third outer inlet communicates with the second outer outlet through the third inner chamber.

7. The multi-way coolant valve of claim 4, wherein in the third mode:
the first outer inlet communicates with the first outer outlet through the first inner chamber; and
the fourth outer inlet communicates with the second outer outlet through the second inner chamber.

8. The multi-way coolant valve of claim 4, wherein in the fourth mode:
the second outer inlet communicates with the first outer outlet through the first inner chamber; and
the fourth outer inlet communicates with the second outer outlet through the fourth inner chamber.

9. The multi-way coolant valve of claim 2, wherein:
the first penetration hole is disposed at a location spaced apart by an angle of 60° with respect to a virtual center line passing through a center of the inner housing;
the second penetration hole is disposed at a location spaced apart from the first penetration hole by an angle of 60°;
the third penetration hole is disposed at a location spaced apart from the second penetration hole by an angle of 120°; and
the fourth penetration hole is disposed at a location spaced apart from the third penetration hole by an angle of 60°.

10. The multi-way coolant valve of claim 2, wherein:
the first and second penetration holes are disposed on the same line with the sixth and seventh penetration holes along the height direction; and
the third and fourth penetration holes are disposed on the same line with the ninth and tenth penetration holes along the height direction of the inner housing.

11. The multi-way coolant valve of claim 2, wherein the fifth to tenth penetration holes are respectively disposed at respective positions spaced apart by an angle of 60° along the exterior circumference of the second inner body.

12. The multi-way coolant valve of claim 1, wherein the third partition wall is configured to divide the interior of the second inner body at an angle of 120° circumferentially.

13. The multi-way coolant valve of claim 1, wherein the outer housing further comprises protrusion portions protruding outward from an exterior circumference of the outer housing at locations corresponding to the first, second, third, and fourth outer inlets to define a space with respect to a subset of the plurality of penetration holes disposed on the first inner body and the second inner body.

14. The multi-way coolant valve of claim 1, wherein:
the first outer inlet, the second outer inlet, and the first outer outlet are disposed in an upper portion of the outer housing corresponding to the first inner body; and
the third outer inlet, the fourth outer inlet, and the second outer outlet are disposed in a lower portion of the outer housing corresponding to the second inner body.

15. A heat pump system comprising:
a multi-way coolant valve comprising:

an outer housing comprising exactly four inlets, a first outer inlet, a second outer inlet, a third outer inlet, and a fourth outer inlet, and exactly two outlets, a first outer outlet and a second outer outlet;

an inner housing rotatably provided within the outer housing and configured to define a coolant flow path, wherein the inner housing is partitioned into two stages through which coolant flows, wherein the inner housing is configured to be operated in a plurality of modes comprising a first mode, a second mode, a third mode, and a fourth mode in which the inner housing is rotated at corresponding angles within the outer housing; and a driver connected to a rotation center of the inner housing and configured to selectively rotate the inner housing within the outer housing, wherein as the inner housing rotates by a preset interval according to a selected mode of a vehicle, the first outer inlet or the second outer inlet selectively communicates with the first outer outlet and the third outer inlet or the fourth outer inlet selectively communicates with the second outer outlet, wherein the inner housing comprises:

an inner body having a cylindrical shape with an open upper and an open lower side, a first partition wall configured to partition the inner body into a first inner body and a second inner body along a height direction, a pair of second partition walls disposed in parallel at both sides of the inner body to define a first inner chamber within the first inner body, a third partition wall configured to divide an interior of the second inner body into second, third, and fourth inner chambers spaced apart at a first preset angle circumferentially around a second rotation center, and a plurality of penetration holes disposed along exterior circumferences of the first inner body and the second inner body;

a first line having a first end connected to the first outer inlet provided in the multi-way coolant valve and a second end connected to a first radiator;

a second line having a first end connected to the first outer outlet provided in the multi-way coolant valve and a second end connected to the first radiator, the second line being provided with a battery module and a chiller connected to an air conditioner unit;

a third line having a first end connected to the second outer inlet provided in the multi-way coolant valve and a second end connected to the second line connecting the first radiator and the battery module;

a fourth line having a first end connected to the third outer inlet provided in the multi-way coolant valve and a second end connected to a second radiator;

a fifth line having a first end connected to the second outer outlet provided in the multi-way coolant valve and a second end connected to the second radiator, the fifth line being provided with an electrical component and an oil cooler; and a sixth line having a first end connected to the fourth outer inlet provided in the multi-way coolant valve and a second end connected to the fifth line, wherein a heat-exchanger included in the air conditioner unit is provided at a location where the sixth line is connected to the fifth line.

16. The heat pump system of claim 15, wherein, in the first mode, the air conditioner unit is stopped and the multi-way coolant valve is configured to:

connect the first line to the second line in order to supply a coolant cooled at the first radiator to the battery module;

close the third line;

connect the fourth line to the fifth line in order to supply the coolant cooled at the second radiator to the electrical component and the oil cooler;

close the sixth line; and operate such that the interconnected first and second lines define an independent closed circuit with respect to the interconnected fourth and fifth lines.

17. The heat pump system of claim 15, wherein, in the second mode, the air conditioner unit is configured to operate to flow a refrigerant through the heat-exchanger and the chiller in order to supply a low temperature coolant to the battery module and the multi-way coolant valve is configured to:

close the first line;

connect the second line to the third line such that the low temperature coolant having passed through the chiller is supplied to the battery module;

connect the fourth line to the fifth line in order to supply the low temperature coolant cooled at the second radiator to the electrical component and the oil cooler respectively;

close the sixth line; and operate such that the interconnected second and third lines define an independent closed circuit with respect to the interconnected fourth and fifth lines.

18. The heat pump system of claim 15, wherein, in the third mode, the air conditioner unit is configured to operate to flow a refrigerant through the heat-exchanger in order to recollect waste heat from the electrical component and the oil cooler, and wherein the multi-way coolant valve is configured to:

connect the first line to the second line;

close the third line and the fourth line;

open the sixth line such that the sixth line and the fifth line are connected; and operate such that the interconnected first and second lines define an independent closed circuit with respect to the interconnected fifth and sixth lines, wherein a part of the fifth line connected to the second radiator is closed.

19. The heat pump system of claim 15, wherein, in the fourth mode, the air conditioner unit is configured to operate to flow a refrigerant through the heat-exchanger and the chiller in order to recollect waste heat from the electrical component, the oil cooler, and the battery module, and wherein the multi-way coolant valve is configured to:

close the first line and connect the second line to the third line;

close the fourth line;

open the sixth line such that the sixth line and the fifth line are connected; and operate such that the interconnected second and third lines define an independent closed circuit with respect to the interconnected fifth and sixth lines, wherein a part of the fifth line connected to the second radiator is closed.

20. The heat pump system of claim 15, wherein the outer housing further comprises protrusion portions protruding outward from an exterior circumference of the outer housing at locations corresponding to the first, second, third, and fourth outer inlets to define a space with respect to a subset of the plurality of penetration holes disposed on the first inner body and the second inner body.

\* \* \* \* \*